United States Patent [19]
Koz

[11] Patent Number: 5,990,955
[45] Date of Patent: Nov. 23, 1999

[54] DUAL ENCODING/COMPRESSION METHOD AND SYSTEM FOR PICTURE QUALITY/DATA DENSITY ENHANCEMENT

[75] Inventor: Mark Koz, Saratoga, Calif.

[73] Assignee: InnovaCom Inc., Santa Clara, Calif.

[21] Appl. No.: 08/943,631

[22] Filed: Oct. 3, 1997

[51] Int. Cl.[6] .................................................... H04N 7/44
[52] U.S. Cl. ........................................ 348/390; 348/404
[58] Field of Search .................................... 348/390, 404, 348/405

[56] References Cited

U.S. PATENT DOCUMENTS

| | | | |
|---|---|---|---|
| 4,821,119 | 4/1989 | Gharvi | 348/402 |
| 4,903,131 | 2/1990 | Lingemann | 348/97 |
| 4,972,260 | 11/1990 | Fugikawa | 348/405 |
| 4,994,918 | 2/1991 | Lingemann | 348/97 |
| 5,134,478 | 7/1992 | Golin | 348/415 |
| 5,144,424 | 9/1992 | Savatier | 348/405 |
| 5,144,429 | 9/1992 | Haghiri | 348/399 |
| 5,193,004 | 3/1993 | Wang | 348/413 |
| 5,247,363 | 9/1993 | Sun | 348/616 |
| 5,301,019 | 4/1994 | Citta | 348/416 |
| 5,384,595 | 1/1995 | Sakaguchi | 348/208 |
| 5,504,523 | 4/1996 | Wight | 348/208 |
| 5,510,834 | 4/1996 | Weiss | 348/97 |
| 5,539,466 | 7/1996 | Igarahashi | 348/404 |
| 5,642,165 | 6/1997 | Suzuki | 348/404 |
| 5,703,646 | 12/1997 | Oda | 348/404 |
| 5,880,784 | 3/1999 | Lillevold | 348/404 |

*Primary Examiner*—Howard Britton
*Attorney, Agent, or Firm*—George M. Steres

[57] ABSTRACT

A digital compression apparatus and method uses a first compression encoding step associated with a first encode circuit to produce a first statistical data set from a first compression encoding of an initial digital video bit stream representing a group of pictures (GOP). The initial bit stream of the GOP is also stored in a first memory, while the first compression encoding is performed. Concurrently with, or following the first compression of the GOP data by the first encoder, a companion processor uses the first statistical data set and optional additional information to compute a set of filter and encoder control settings. The initial digital video bit stream of the GOP data previously stored in the first memory is retrieved from the memory after the first encoding step and is input as a time delayed version of the initial digital video bit stream through a set of filters and subsequently through a second compression encode circuit to produce a second compressed video bit stream of the GOP data. The filters are configured to provide dynamically variable filter characteristics that are responsive to the filter control settings from the companion processor. The filter characteristics can be changed optionally by the companion processor on a block, frame or GOP basis. The second encode circuit also has encoder characteristics responsive to the encoder control settings. The filter and encoder control settings selected by the companion enable the second encoder to provide enhanced compression encoding performance second compression encoding of the GOP data video bit stream relative to the compression of the first encode circuit. In particular, the second compressed bit stream may have improved performance in either or both bit rate and total bits relative to the compression of the first encode circuit.

26 Claims, 10 Drawing Sheets

DUAL ENCODING/COMPRESSION METHOD AND SYSTEM FOR PICTURE QUALITY/DATA DENSITY ENHANCEMENT

BACKGROUND OF THE INVENTION

1. Field of the Invention

The present invention relates to a method and system of compressing or compacting digital data. More specifically, the invention pertains to an apparatus and method of maximizing the quality and efficiency of transferring compressed digital information.

The present invention improves various aspects of video data compression by dynamically (i.e., real time) applying selected filtering and encoding parameters during a second, delayed encoding of a stored representation of an input digital data structure, e.g., a bit-stream, based on the results of a first encoding of the input data structure (bit-stream).

2. Background Art

Transmission and/or storage of digital data are employed in nearly all data processing and transmission applications. Large scale archiving and retrieval of documents may require very high-capacity storage devices and media. Also, transfer of massive quantities of data over long distance communications facilities is rapidly increasing. Digital storage or communication systems are designed with a capacity limit for total bits or maximum bit rate, typically termed the 11 bit budget 11. In order to reduce the costs associated with the transfer and/or storage of massive amounts of data, the bit budget, i.e. the bit rate transmitted through a transmission channel of fixed capacity and/or the total number of bits to be stored in a storage media, is minimized as much as possible. In the field of digital video transmission or digital video storage and retrieval, great attention has been directed to data compression and compaction to reduce costs and improve performance under bit budget constraints.

Data compression may be classified as reversible or irreversible, where reversible means there is no loss of information, as opposed to irreversible, where there is some loss of non-relevant information (where the non-relevance depends on the given context). Irreversible compression is generally called compaction although there are no standard definitions. In the context of video transmission and storage, the term compression is often be used loosely with either sense. For the purposes of this application, compression means either reversible or irreversible, unless otherwise specifically stated.

A basic reference on data compression is found in Encyclopedia of Computer Science, Third Edition, Anthony Ralson, et al, Van Nostrand Reinhold, New York, 1993, page 396. The issues of redundancy, security, portability and various compression techniques are briefly described therein.

Digital data compression plays an important role in video storage and transmission. The same techniques may also used in other fields, e.g. field of audio signal transmission and storage, sonar signal transmission and processing, geophysical, weather data recording and transmission and the like. Since the bandwidth requirements of video are generally many times greater than that of audio and the others, more attention has been given to compressing digital video data. However, the same techniques may be applied to compression of audio data as a subset of a program containing both audio and video content.

A discussion of video signal compression encoding, as established by the Moving Picture Experts Group (MPEG) is shown in the PCT patent WO 96/36182 by Maturi et al, (Maturi) incorporated herein by reference. Like the JPEG still image compression standard, MPEG is a multistage algorithm built around the discrete cosine transform (DCT). The two algorithms also share similar approaches to color space conversion, blocking, quantization, zigzag ordering, run length tokenizing, and Huffman encoding. MPEG goes further, adding interframe compression and interleaved audio. As with most interframe compression schemes, MPEG is asymmetric—compression requires more effort than decompression.

With reference to FIG. 1, there is shown a simplified block diagram of a portion of a typical MPEG-2 encoding process 10. An incoming uncompressed digital data stream, e.g. video stream 12 is input to Discrete Cosine Transform (DCT) encoder 14, to produce DCT coefficients which are quantized by quantizing means 16. The DCT coefficients are then arranged in zigzag order by zigzag scanning means 18. The ordered DCT coefficients are further encoded (variable length (VLC) and token or Huffman encoding), e.g. encoded by VLC 20. Simultaneously, the uncompressed video stream 12 is being processed in a motion detection and motion vector generation (MVG) means 22 by comparison to previously stored (not shown) digitized video data.

Generally the MVG 22 performs motion estimation (ME) and exchanges ME data 24 with the VLC encoding process 20 and a picture type determining means 26. A final MPEG-2 coded video stream 30 is output for recording or transmission.

Maturi discusses MPEG encoding in general, and describes one example of an MPEG encoder using an encoder decision block (EDB) for compressing/decompressing in the MPEG-II protocol. See in particular FIG. 2 of Maturi reproduced here as FIG. 3, and the description from page 1, line 30 to page 5, line 21 of Maturi.

An exemplary MPEG-2 encoder 200 after Maturi is shown generally in FIG. 2. A Video Interface (VI) 202 receives an incoming digitized video signal (DV) 204. The VI 202 electrically communicates directly with a Motion Estimator (ME) 206, an encoder memory controller (MDC) 207, and is electrically connected to a bus 208. The ME 206 is also connected in direct electrical communication with the MDC 207, and bus 208.

The MDC 207 is also in direct communication with an Encoder Memory (ENC/MEM) that may be, for example, part of a larger Main DRAM (MDRAM) memory 226 (not part of the MPEG-2 encoder 200), the bus 208 and an encode pipe (ENC) 212. An Encoding Decision Block (EDB) 210 is in direct electrical communication with the bus 208, the ENC 212 and a Video System Stream Multiplexor (VSM) 214. The ENC 212 also communicates directly with the bus 208 as does the VSM 214. An Output Stream Interface (OSI) 216 is electrically connected directly to a Host Interface (HI) 218, the bus 208 and outputs an MPEG-2 encoded Output Video Stream (OV) 230.

An Audio Interface (AUD) 220 accepts a Compressed Audio digital stream (CA) 228 and is directly connected to the HI 218 and bus 208. A Host Computer (HC) 222 (not part of the MPEG-2 encoder) is directly connected to the HI 218 which provides communication to a Host DRAM (HD) 224 not part of the MPEG-2 encoder, i.e. a companion memory for storing data and programs used in conjunction with the encoder 200. The HI 218 also connects directly to the bus 208 for communication with all the elements similarly connected to the bus 208.

The EDB 210 retrieves digital video data for a macro block (explained further below) from the encoder memory 226 together with a corresponding motion vector (not shown) from the host DRAM 224, and processes the macro block video data to determine various encoding conditions the encoder 200 will apply in encoding the particular macro block. For example, the EDB 210 decides whether a macro block is to be intra-frame (P) or inter-frame (I) encoded, as well as determining the quantization for a particular macro block. The EDB 210 also causes the motion vector to specify a DCT type of translation field for a macro block, as well as selecting an encoding for the macro block. The encoding selection should produce a pre-specified bit rate at which data will be fed through the remaining components of the encoder chip 200.

The Encode Pipe (ENC) 212 is connected to receive the output from the EDB 210, and actually encodes the macro blocks. The encoding may be performed in accordance with encoding conditions determined by the EDB 210, or alternatively, may be performed in accordance with encoding conditions that are supplied to the encoder chip through the HI 218. The ENC 212 computes the DCT of a block, quantizes the coefficients and performs run length (RLL) and variable length coding (VLC and/or Huffman).

The EDB 210 compresses the digitized video by subdividing successive macro blocks of digital video data into 8×8 blocks and processing the blocks.

The AUD 220 is provided to compress digital audio data in accordance with the MPEG-2 protocol, and transmit compressed audio data to the host DRAM 224. The other system components, e.g. the VSM 214, the OSI 216 provide for converting from parallel to serial bit stream and the like. A source of compressed audio data 228 is connected to the audio interface 220 for inclusion in a system output data stream 230 from the output stream interface 216.

Maturi also discusses a motion estimator used for determining the direction and amount of motion between associated macro blocks belonging to related P or B frames. Once a motion vector is determined it is stored in the host DRAM 224 via a host interface. Motion vectors may be used in later calculations, thereby saving microprocessor execution cycles.

FIG. 3 depicts an encoded video image, for example, in the MPEG-2 format. A succession of video frames (302 . . . 306), is comprised of a group of pictures, GOP(J) 300, organized by a coding algorithm into a digitized video pixel serial bit stream, pJ[i]. A typical coding protocol, e.g. the (4:2:0) coding protocol is shown in FIG. 3. The GOP (J)300 is composed of a first frame 302 to a last frame 306, separated by a plurality of frames 304. There are generally three different encoding formats, which may be applied to video data. The frames 304 are generally composed of Intra (I), Predicted (P) and Bi-directional (B) frames.

The format of the GOP structure may vary. The ISO/TEC 13818-2 video specification indicates GOPs can contain one or more pictures or frames. Two typical formats are 12 frames/GOP, derived from film, which is 24 frames per second (fps), and 15 frames/GOP, which is more suitable for video at 30 fps. Other GOP/frame formats may be encompassed by video compression systems, e.g., PAL at 24 fps. Essentially, the choice of the number of frames (Nf) or pictures to be included as the GOP, is independent of the frame rate (fps) of the media from which the video data is derived.

Frames 304–306 are divided into slices, e.g.,slice 307. Slices 307 are divided into Macroblocks 308 that are further divided into Luminance blocks 310 (Y1–Y4) and Chrominance blocks 312 (Cb, Cr). Each of the blocks 310, 312 are comprised of blocks 314 organized from pixels (PJ[i]) 320.

The Intra or I frame coding produces an I block, designating a block of data where the encoding relies solely on information within a video frame where the macro block 308 of data is located, Inter-frame coding may produce either a P block or a B block. A P block designates a block of data where the encoding relies on a prediction based upon blocks of information found in a prior video frame. A B block is a block of data where the encoding relies on a prediction based upon clocks of data from surrounding video frames, i.e., a prior I or P frame and/or a subsequent P frame of video data. One means used to eliminate frame-to-frame redundancy is to estimate the displacement of moving objects in the video images, and encode motion vectors representing such motion from frame to frame.

A GOP will necessarily start with an I frame and continue through a succession of multiple B and P frames 304 until the last frame 306, also generally an I frame. The frames are further subdivided into slices 307 representing, for example, a plurality of image lines. Each slice 307 is composed of macro blocks 308. Each macro block 308 is a block array representing the luminance (intensity) 4 blocks 310 of pixel luminance (Y1–Y4) and two blocks 312 representing interpolated pixel chrominance.

The 4:2:0 macro blocks 308 are further divided into 4 luminance blocks 310 (Y1, Y2, Y3, and Y4) and 2 chrominance blocks 312(Cr, Cb). Each block 310, 312 consists of an 8×8 array of bytes, each luminance byte being the intensity of the corresponding pixel, and each chrominance byte being the chrominance intensity interpolated from the chrominance intensity of four adjacent pixels. The MPEG-2 protocol encodes luminance and chrominance data and then combines the encoded video data into a MPEG-2 compressed video bit stream.

The meaning of the video bit stream nomenclature has some ambiguity in the art. For the purposes of this discussion, video bit stream means both 'raw' bit streams, i.e. uncompressed (may be encoded or un-encoded) video bit streams, and compressed (may be encoded prior to or after compression) video bit streams (compressed by the methods and apparatus of this invention). In this discussion the terms input and output will indicate which of the two bit streams are concerned. "Input" means uncompressed video bit stream; "output" means a compressed video bit stream.

In addition, an input video bit stream may have previously been compressed by some other means than that of the current discussion. In that case, the term, input, means the video bit stream provided to the particular device or method being considered, prior to the compression of the device or method.

After the video data is encoded it is then compressed, buffered, modulated and finally transmitted to a decoder (not shown) in accordance with the MPEG-2 protocol. The MPEG-2 protocol typically includes a plurality of layers each with respective header information. Nominally each header includes a start code, data related to the respective layer and provisions for adding header information, e.g., see FIG. 5.

With reference to FIG. 3, there is shown a typical arrangement of video data, that comprises a portion, GOP(J), of digital data compressed in the example above. A first portion and second portion of video data stream 102 will typically correspond to at least a first group of pictures (GOP(J)) and second group of pictures (GOP(J+1) not shown) one of which is shown in FIG. 3. The GOPs 300 are composed of a succession of digitized video frames 302–306. The frames 302–306 are of three types: an I frame, a P frame and a B frame.

An MPEG-2 I frame contains all the digital data needed to decode and reconstruct the uncompressed picture for that frame within its own data set without reference to any other data. The MPEG-2 P frames are digital data sets which can be decoded to recreate an entire uncompressed frame of video data by reference only to a prior decoded I frame or by reference to a prior decoded P frame.

The MPEG-2 B frames are digital data sets which may be decoded to recreate an entire uncompressed frame of video data in three ways. B-frames are recreated by reference to only a prior reference frame, to only a subsequent reference frame, or to both a prior and to a subsequent reference frame, (by reference to a future or previous decoded I, P frame or frames).

Each frame 304 is divided into a sequence of slices 306. The slices 306 are further divided into a succession of macro blocks 308. The macro blocks 308 typically separate the luminance and chrominance data into a 4:2:0 encoding scheme. This contains the pixel luminance data (Y data) in four 8×8 blocks 310 Y1, Y2, Y3, Y4, and the pixel chrominance data (Cr, Cb) in two 8× 8 blocks 312 which cover the same area, but which are sub-sampled at half the spatial frequency.

In the typical 4:2:0 sampling scheme for digitized video encoding, each macro block 308 thus consists of a 16 by 16 pixel (or pel) array of digitized luminance video data and two 8×8 pixel arrays 312 of digitized chrominance data. If the current frame is to be an I frame, which does not depend on any other frame, the encoding process proceeds to the next step. If the current frame is to be a P frame, however, interframe correlation must be performed first.

For each macro block a reference frame is sought, seeking the best match. Upon finding an exact or near-exact match, only a pointer to the matching pixels must be encoded. This pointer is called a motion vector and typically only requires a few bits of storage space. The search is performed by the motion estimator 206. Often a perfect match is unavailable because objects don't simply float across the screen, but may also rotate, fade, change shape and move toward or away from the viewer. In this case, the search may still provide a partial match from which there may be computed the difference between current and reference pixels. The resulting difference pixels are often highly correlated, and therefore, are amenable to compression.

Blocks coded differentially require more storage than perfectly matched blocks, but still save coded bytes over intra coding. In the event of search results so poor that even differential coding is not practical, the data for that macro block is simply coded as intra-type.

For B frames, a similar process is used, but both previous and future frames are searched for the reference pixels. Having two separate reference frames available yields higher correlation and thereby higher compression.

The motion estimator 206 determines the direction and amount of motion between macro blocks 310 belonging to different frames of the video data being encoded.

After interframe correlation, differentially encoded P and B blocks and those coded as intra-type are fed into a DCT which maps each 8×8 block of pixels into 64 frequency coefficients. Each coefficient represents a weighting factor for a corresponding cosine curve.

The 64 basis cosine curves vary in frequency: low frequencies describe the block's coarse structure, while high frequencies fill in the detail. Adding the 64 weighted basis curves together will reproduce the original 64 pixels. By itself, the encoding of the DCT provides no compression.

But the lack of extreme detail in most image blocks means high-frequency coefficients are typically zero or near zero.

To increase the number of zero frequency coefficients and reduce the number of bits needed for nonzero frequencies, each coefficient is divided by a quantizer value. Because the eye is less sensitive to errors in high-frequency coefficients, the quantizer values tend to increase with frequency. MPEG uses one quantizer table for intra-macro blocks and another for non-intra macro blocks. The encoder chip can use the default quantizer tables or use customized quantizer tables.

Quantizing causes a loss of image content. Large quantizer values cause more loss (i.e. greater image degradation, lower quality) but also deliver higher compression. This effect can be used to hold the output stream 230 data bit rate to a desired constant value, e.g. to not exceed a channel capacity constraint. On the other hand, if a frame uses more bits than allocated, the quantizer value is adjusted until the bit count falls below a preestablished maximum. MPEG normally provides a quantizer scale parameter, which can be adjusted once per macro block, expressly for this purpose.

The quantized frequency coefficients are zigzag ordered. Zigzag ordering produces long zero runs suited to run-length encoding. In run-length encoding, each run of zeros is expressed as a data token describing the number of zero value frequency coefficients in the run and the value of the nonzero frequency coefficient that ends it. These tokens are further compressed through Huffman coding, which converts each token into a variable length code (VLC). VLCs for more common tokens are 2–3 bits long, whereas VLCs for rare tokens are up to 28 bits long. The final bit stream, consisting mainly of very short codes, is roughly one-third the size of the run token stream.

As the data stream is compressed, MPEG-defined data header packets may be inserted to assist the downstream decoder. Each header begins with a unique 32-bit start code. A sequence header may define frame rate, and other characteristics. A group of picture headers may be inserted before I frames to indicate random access entry points. Picture headers may be inserted to identify each frame and communicate frame-specific information, such as I, P, or B frame type. Slice codes may be inserted at various locations in the frame to give downstream decoders a chance to be re-synchronized if an error condition, such as a corrupted bit stream, is detected. The compressed data combined with the headers make up a fully defined MPEG-2 output video data stream 230.

The audio interface 220 uses the MPEG audio compression algorithm with sub-band filters to divide the audio signal into frequency bins. Fewer bits may be allocated to the less-audible bins, to achieve compression of the audio data. MPEG can typically store CD-quality audio at compression ratios of up to 8:1 or more. Audio compression as high as 20:1 can be achieved with additional audio degradation if desired.

As a final step, the compressed audio bit streams from the audio interface 220 and the compressed video Bit stream from the video system Multiplexor 214 are packetized and combined in the output stream interface 216 to output the final compressed MPEG system stream 230. Time stamps may be inserted to help the downstream decoder separate and synchronize the audio and video bit streams.

Decompression essentially reverses the process described for compression, but requires fewer computations, as there is no need for the pixel searches (i.e. motion vectors).

The encoding decision block 210 performs macro block 310 intra/inter/Quantizing decisions, makes field and frame decisions, and performs rate control, half-pel motion estimation and video buffer verifier (VBV) calculations. The encode pipe 212 encodes macro blocks 310 comprising the digitized video data 204. Based either on results from the encoding decision block 210, or based upon parameters specified via the host interface 218, the encode pipe 212 accepts and processes the digitized video data 204 together with data produced by the encoding decision block 210.

While the motion estimator 206 determines motion vectors and the encoding decision block 210 selects an encoding mode by processing 16×16 macro blocks 310 (the macro blocks 310 being composed of four luminance blocks 311 and 2 chrominance blocks 312), the encode pipe 212 transforms the digitized video data and quantizes the transformed video data by processing 8×8 blocks 314. Each 8×8 block 314 is transformed by computing DCT coefficients, then the DCT coefficients thus computed are quantized to further reduce the amount of data.

If an interframe macro block cannot be adequately encoded simply by motion vectors alone, a DCT is computed of the difference between it's reference frame(s) or field(s) and the macro block's video data, and the DCT coefficients obtained for this difference macro block are quantized. If P frame(s) provide the difference for an inter macro block, then the DCT is computed of the difference between the macro block's video data and the decoded P frame data to obtain the maximum accuracy in the macro block's encoding. The transformed, quantized data thus obtained are then coded into an MPEG-2 video stream using variable length coding (VLC or Huffman). The encode pipe 212 also performs the inverse of these operations simultaneously on P frame encoded data.

The final encoded output video bit stream 230 is output to a transmission or recording media, e.g. satellite, cable, DVD ROM, and the like.

With previous digital data compression systems for real-time compression of video data, digital data is compressed using a variety of mathematical algorithms. The algorithms are processed with hardwired circuits and/or programmable micro-or multi-processing components comprising the encoder 200 connected to memory circuits, typically RAM, ROM and disk. In the design and use of such systems, choices must be made regarding the quality level of the encode video output 230, derived from the compressed data, which will be accepted and the size of the communication channels and/or media on which and through which the compressed digital data 230 will be stored or sent.

For previous systems, this generally demands choosing the maximum available quality level or minimum acceptable quality level of the decoded representation of the compressed data as a constant, limited by the algorithms employed and the fixed compression parameters selected for the particular hardware involved. Alternatively, the maximum encoded bit rate allowable can be chosen, and compression parameter selection strategy fixed so that the quality level will usually be acceptable. This can often lead to the unfortunate consequence that portions of fast moving video scenes are grossly distorted, e.g. gross quantization causing objects to be displayed as unrecognizable blocks (the infamous cubical football). This can occur when the fixed parameters chosen for the selected filter and compression strategy can not meet the hard system limits, maximum bit rate or maximum bit capacity.

A typical limiting case strategy is to program the EDB to do gross quantization of problematic macro blocks, i.e. transmit only DC DCT coefficients for a block or blocks, to stay within the hard limits. Another strategy in non-real time applications, is to do manual post processing, i.e. human intervention by selecting and hand editing scenes.

Neither of these conditions are desirable, in terms of quality or cost. Compression systems that inherently are unable to provide controllable quality levels throughout a video program, having widely varying activity levels will not be able to guarantee acceptably uniform quality in real time. Second, video program material having widely varying video activity generally leads to increased cost (where post processing is necessary, or in number of DVD layers required for long program material). Third, distribution of the compressed video signal through rigidly specified outlets, i.e. through well known and completely controlled receiving hardware/sets may be limited by the bit rate variability of the compression system. Consumers, and consequently the advertisers who must pay for the received signal, may be less than sanguine about receiving programs whose quality level may fluctuate significantly, depending on program content.

In real time systems, i.e. cable and satellite TV, the instantaneous output encoded bit rate can exceed channel capacity, unless a) the overall quality of the decoded video bit stream is 10 lowered by choosing a compression parameter strategy to avoid the possibility of gross quantization during particularly problematic scenes, or b) blocky artifacts may be created during fast motion scene change or the like; in any event sound or picture quality must be degraded to a lower level than desired over portions or all of an entire program.

Typical prior art compression schemes use what is known as panic mode quantization, i.e. transmitting only DC coefficients when an unexpected scene change, scene fade or picture components with very fast motion would otherwise create unacceptable encoded bit rates.

In some prior art MPEG-2 encoder implementations, the encoder is designed to attempt to address these problems by performing measures of encoded quality and bit rate during the encoding of the frames of a GOP.

With reference to FIGS. 2 through 5 one typical prior art MPEG-2 encoding scheme will now be described. Referring to FIG. 4 and FIG. 2, a video buffer 400 may be incorporated in the encode pipe 212. One implementation of a video buffer is composed of two FIFOs, FIFO A 402, and FIFO B 404. An intermediate portion of the encoded video bit stream 420 (processed internally by ENC 212) is switched between an input 412 of FIFO A 402 and an input 414 of FIFO B 404 by input switch S1.

While the input switch S1 is connected to FIFO input 412, an output switch S2 connects an output 418 so that a segment (not shown) of encoded video bit stream data previously stored in FIFO B 404 is output as a corresponding segment of output video bit stream 422. The encoded input stream 420 remains connected to input 412 until a FIFO A ALMOST FULL signal 408 causes the switch S1 to switch the video bit stream input 420 to the FIFO B input 414. Signal 408 also causes the switch S2 to switch the video bit stream 422 to the FIFO A output 416.

The segment of video bit stream data stored in FIFO A 402 while S1 was connected to input 412 is connected by switch S2 through output 416 to the output encoded bit stream 422. Conversely, the switch S1 remains connected to FIFO B 404 until a FIFO B ALMOST FULL signal 410 causes switch S1 and S2 to toggle again. The segment of video bit stream data that has been stored in FIFO B 404 is then transferred out as the next segment of encoded output video bit stream data 422.

This type of video buffer is termed a □see-saw□ buffer since FIFO A and FIFO B alternately store incoming video bit stream data and transmit outgoing video bit stream data while keeping the encoded output bit stream 422 continuous and independent of the bit rate of encoded input bit stream 420. The bit rate of the input encoded video data 420 will in general be highly dependent on the content and complexity of the video input.

The sawtooth graph 430 of FIG. 4 represents the alternate filling and emptying of the two FIFOs 402, 404 from minimum (empty) level 434 to almost full level 436. The encoded bit stream 422 will have an instantaneous bit rate 440 represented by the slope of the saw tooth 430. For highly complex video scenes, e.g. fast motion, fades and chaotic fire and water pictures, the encoded bit rate will be high, i.e. steep slope 440. Conversely, static or scenes with a deficit of detail will have low bit rate, i.e. approaching zero slope.

The changing instantaneous bit rate 440 combined with the size of the FIFOs 402, 404 will result in a variable period 438 between the toggling of the switches S1 and S2. This variable period 438 is typically used by the EDB 210 as a statistical measure, viz. Vbv, in an algorithm (not shown) to change encoding conditions by the ENC 212 or to change filtering conditions (not shown) by the VI 202 as is well known in the art.

The digitized video bit stream 204 of typical prior art MPEG-2 encoder is processed in real time by the encoder 200. Decisions made by the prior art EDB 210 comes from a portion of the video data which has already been sent through the ENC 212 to the VSM 214 and subsequently to and through the OSI 216. Consequently, the effect of a prior art EDB decision takes place on input video data which may have markedly different characteristics from that which preceded it and which generated the statistical measure used for the EDB decision.

This has been particularly true for scene changes and fades that typically may cause drastic quantization, known as □Blocky□ artifacts. Blocky artifacts are typical in previous satellite systems in prior art encoded video since a □panic mode□ strategy must generally be resorted to in order to keep the bit rate of the output encoded video 230 below a maximum channel capacity limit.

In prior art off-line compression systems, an operator has the opportunity to view problematic scenes and by iterative procedures choose a compromise between number of bits and quality level of individual scenes to stay within the constraint of fixed media size, i.e. there are only so many bits into which a movie may be encoded. A lengthy video feature with a high degree of action may require many scenes to have lower video quality than is otherwise desired in order to keep the movie on one reel of tape or one layer of one CD-ROM/DVD or the like.

In either previous art real-time or off-line digital video data compression systems, there is a high labor cost for trading off picture quality and digital data bit rate and/or required bit capacity.

It would be an advantage to selectively and dynamically modify compression of digital video data controllably and continuously within given bit rate and quality constraints. The quality level and/or instantaneous bit rate during short periods of time can then be managed within pre-set limits while maintaining higher quality over the majority of the program. Alternatively, by limiting the instantaneous transmitted bit rate to stay within channel capacity limits while simultaneously managing the quality level of the subsequently decoded compressed video to a predetermined level.

A consumer and the advertiser paying for the program could be assured that the video quality of the compressed program material would have a consistent look throughout the entire program, irrespective of the type of program material. The vendor providing the compression could confidently guarantee the quality level would never degrade below a minimum and would have a high (and guaranteed) quality level for a maximum (and large) percentage of the program, and at the same time, never exceed a channel bit rate limit or a media bit capacity limit.

In previous digital video compression systems, difficulties can also arise when program content changes from film input (frame mode) to video (field mode). This commonly occurs when watching a film on TV, which then breaks to a commercial. The film was digitized at 24 frames per second (fps) and the commercial at 30 fps. This can create a huge error budget instantly, and causes severe picture quality degradation. This cannot be predicted since the programming station may do so at any time. If this break occurs within a GOP, which it typically does, at least one frame may have an unacceptably large bit rate or bit size.

Another area of concern arises during scene changes, especially fades, where all the pixels of each frame may change intensity and/or color over an extended number of GOPS.

It would be an advantage to have a compression method and apparatus, which could smoothly respond to field/frame changes and fast motion while still maintaining a high degree of picture quality.

Another item of concern in digital compression of video images is the unsteadiness of the source material. During the conversion of any one frame of the source material image (which is represented by a 2-dimensional analog of color and intensity; i.e. film, or a video frame) to another representation (in this case a digital signal) the position of the image of any one frame or picture relative to a device which is converting the image from analog to digital, may change. Not only the image as a whole may shift, but the position or shape of edges of the image may vary relative to the image as a whole.

Film that is fed to a telecine during digital video capture may wobble back and forth in a kind of sinusoidal pattern as it passes through the telecine film gate. It typically □walks□ back and forth, at some cadence. The rate of the cadence is dependent on the tension of the film, and many other factors. This is sometimes seen at a movie theater, where the image drifts laterally and vertically across the screen.

Due to wear in the mechanical system of a projector or telecine, the film can move up and down or back and forth. Vertically and horizontally the frame can move +/−4 pixels or more from a reference center. This wobble or walking of the frame causes unnecessary usage of encoding bits for an encoding algorithm, viz., MPEG, because the changes from frame to frame are interpreted as though the entire scene has changed, whereas the scene has just moved side to side or up and down. If the entire image can be moved back to where it should be, then the MPEG encoding doesn't produce unnecessary encoding bits. Global motion from other sources in video camera scenes, for example, unsteady hand held video cameras may also be compensated by the MSF.

Even though the film image for each frame is stationary with respect to its components, and changes otherwise from frame to frame may be minor or non-existent, prior art digitizing schemes can cause digital compression encoders to generate unnecessary bits in encoding such "walking" scenes because they are unable to distinguish the frame to frame wandering or walking of the whole image from complete scene changes. Digital conversion of such unsteady or wandering, scanned images can grossly increase the number of bits required to encode multiple frames of sequential images, even though the image has not changed significantly from frame to frame. It would be an advantage to provide a method and apparatus to reduce the creation of unnecessary encoded bits caused by walking film during digitizing.

Attempts have been made to account for image unsteadiness, or walking. Lingemann, in U.S. Pat. No. 4,994,918 describes a method and circuit for detection and correction of horizontal and vertical errors in image unsteadiness during television scanning of moving pictures. Lingemann discloses a tachometer roll engaging the perforations of the film. Electronic circuitry provides pulse generation and counting in combination with horizontal and vertical image steadiness signals to control the beginning an ending of the scanning period. This requires a tachometer engaged with the film as part of the equipment. This method and circuitry will not accommodate images from video sources derived from film previously converted to video, nor does it address video sources which themselves have unsteady images, e.g. hand held cameras.

In Weiss et al., U.S. Pat. No. 5,510,834 (Weiss), there is disclosed a method of estimation of global error motion vectors which represent unwanted global picture instabilities in a picture sequence in digital video signals. Weiss describes global motion as a combination of true global motion (such as pan and zoom) and unwanted global picture instabilities from, e.g. worn-out film sprocket holes, poorly performing telecine, film stretch, or unsteady camera shots. Unwanted global motion may be a single global error motion vector for each picture or may be a global error motion vector field for the entire picture.

Known methods for estimating global error motion vectors involve using known motion vector estimation techniques such as, e.g., pixel gradient recursion, phase correlation, and block matching (see, e.g., PCT/SE92/00219), combined with spatial and temporal processing of the estimated motion vectors.

Weiss uses a motion vector estimator with an adaptively variable measuring time distance, as well as spatial processing and temporal processing, in order to estimate a sequence of global motion vectors, from which a sequence of global error motion vectors is separated in order to allow stabilization of a picture sequence. Weiss uses a local motion vector estimator with a measuring time distance adapted to a maximum motion vector length and motion vector frequency, combined with spatial processing, and temporal processing. Weiss makes an estimate of a sequence of global error motion vectors based on an estimated sequence of the global motion vectors associated with pictures in the picture sequence.

Weiss method addresses the difficulty in known motion vector estimators to make accurate estimation of both large and small motion vectors, due to the fact that known motion vector estimators use a fixed measuring time distance. In the general case, fixing the time distance will be disadvantageous for either large or small motion vectors depending on which is chosen and the motion vector frequency.

One disadvantage of Weiss method is the necessity for an operator to place flags at selected points, which establish the image portion, which is judged to be stable. That is, active human judgement is required to set a basic image reference point or points from which motion corrections will be made.

SUMMARY OF THE INVENTION

One object of the present invention is to dynamically adjust the compressed video bit stream bit rate for transmission over an external transmission system, consistent with the external transmission capacity constraints and predefined quality limits.

Another object of the invention is to dynamically adjust encoded picture quality over an entire video movie with predetermined quality limits for storage on a media with a fixed capacity.

Yet another objective of the invention is to provide a digital compression system and method to utilize computation resources, e.g. real time compression computer algorithms and hardware, in a more efficient manner to achieve a desired level of video quality at a specified maximum bit rate of a compressed video bit stream.

Still anther objective of the invention is to provide a digital compression system and method for reducing the maximum bit rate of a compressed video bit stream needed to produce a desired level of video quality.

It is also an objective of this invention to provide a digital compression system and method for reducing the maximum number of bits required to compress a video scene or sequence of scenes at a desired quality level, or at a set of desired levels.

It is an advantage provided by certain embodiments of the present invention to generate, control and input to a transmission system a plurality of parallel compressed video bit streams having a predefined hierarchy of quality level and maximum bit rate values.

Embodiments of the invention accomplish this by inputting raw digital video, viz., an uncompressed video bit stream, comprising a first GOP, (immediately filtering it to the highest quality possible, if desired), sending the filtered video bit stream to a first real time MPEG encoder (the pre-encoder), gathering a first set of encoding statistics from the encoding of the first GOP by the first encoder, as the first compression encoding of the input stream into I P, and B frame data happens in real time. Meanwhile a copy of the entire uncompressed, (i.e. raw input), filtered, video bit stream is stored in a companion storage memory as a first set of frames, i.e. the first entire group of pictures (the first GOP).

The first set of encoding statistics gathered from the first compression encode of the first GOP are processed by a companion processor to determine a new set of encoding parameters and/or filtering conditions to be subsequently applied to a second MPEG encoder. The new set of filtering conditions may be used to filter the previously stored, uncompressed video data from the first GOP, before doing a final output compression encode by the second encoder.

The stored, uncompressed video bit stream from the first GOP is then compression encoded for transmission and/or storage, by the second MPEG encoder. The second MPEG encoder compression encodes the stored, uncompressed video bit stream with the new set of encoding parameters determined by the companion processor based on the first set of encoding statistics gathered from the first compression encode of the first GOP.

Simultaneously, as the second encoder is encoding and outputting the final encoded and compressed video bit stream (i.e. the output bit stream) of the first GOP, the first encoder is processing a new uncompressed, unfiltered, input video stream from the next GOP, outputting a next set of encoding statistics to the processor.

The new set of encoding parameters and/or filtering conditions provided to the second encoder for the second encode of the first uncompressed GOP may be fixed over the entire second encoding of the first GOP. Alternatively, the new set of encoding parameters and/or filtering conditions may be varied during the second encoding of the first GOP. The new set of encoding parameters and/or filtering conditions may be selected by a predetermined parameter selection method using as inputs, the first encode statistics in combination with one or more predetermined sets of rules stored in a companion processing unit.

Another alternative for varying the new set of encoding parameters and/or filtering conditions, may be provided by rules hardwired in circuitry attached to or included in the second encoder.

The companion processor for processing the encoding statistics from the first encoder, and supplying a new set of encoding conditions to the second encoder, may be a separate host processor, memory and interface connected to the first and second encoders. For example, the companion processor may be a conventional microprocessor (e.g. Intel x86 and the like), memory (e.g. DRAM), having a host to encoder interface for connecting to the two encoders. The companion processor may also be incorporated into additional processing circuitry forming parts of the two encoders.

The video bit stream between input and output is delayed by an entire GOP, and any desired first encoding statistics are gathered from the pre-encoder. Changes in the first encode statistics may be used to determine where scene cuts, fade or dissolves occur within the GOP, for example. Drastic or radical changes in the first encoding of the video data during the GOP may also be used, for example, to decide if it is necessary to force additional I frames. This permits data rate management on an entire group of pictures, since it can be known if there would otherwise be a condition known as run-away bits, i.e. a data rate higher than desired or allowable for the system of interest. This enables the system to dynamically budget for a run away condition and provides an alternative means of handling the data stream, which maintains the quality level and encoded bit rate, specified.

Other frames within the GOP may be available which permit encoding at the lowest bit rate possible. The statistics may be gathered into a memory or bank of files on a frame by frame basis. A host processor or other processor may use the statistics to adjust encoding conditions for the second MPEG (output) encoder based on those statistics to improve the encoding of the final encoded video data stream with only the delay of a GOP.

One or more algorithms computed by the processor using the gathered statistics may be used to provide compression control inputs to the output encoder and/or both to preceding video data filters and the output encoder for final encoding.

Statistical parameters gathered by the pre-encoder during the first encode step may be all or a selected set of available parameters, e.g. recovered SQ (defined below) of the reference images, motion estimation vectors (MEV) in either or both frame and field mode and the like. The reason for doing that is to detect which frames, if any may have unacceptable SQ, i.e. unbounded error. This can provide an indication that the video type has changed from frame to field mode or vice versa, which is possible in the middle of a GOP.

Capturing a frame-to-field or field-to-frame event allows the host processor to adjust the encoding parameters of the output encoder to accommodate the input video change while maintaining the quality level and the output video bit stream rate within the constraints imposed by system requirements.

In a preferred embodiment of the invention, the input digital video bit stream may be filtered by a motion steadying filter (NSF) before the pre-encode. The MSF is a steadying algorithm for video frames having significant global motion between frames, e.g. film being digitized which wobbles in the gate of a telecine.

Standard filtering, e.g. spatial, temporal and median filters under dynamic control of the associated processor may be incorporated in the video bit stream prior to the final encode for further improvement in data rate at a given picture quality, or reduced data rate at a given quality level.

One aspect of the present invention is providing the capability of changing the characteristics of the filters on a frame by frame or block by block basis as a result of the algorithms computed by the processor based on the statistics from the first encode of the GOP. Filter characteristics may be adjusted to smoothly compensate for excessive pre-encode bit rate, such that final output bit rate is reduced with only a minor or unnoticeable change in picture quality level. Some picture areas are filtered more than others, by determining the filter characteristics adjusted for specific blocks or frames based on the statistics gathered over the GOP. The processor can choose the characteristics of the filters to reduce the number of bits needed to encode a particular block, or frame, for example.

The actual filter response curve(s) can be derived many ways. The Walsh binary-based transform can be used to derive desired filter shapes such as Bessel, Chebyshev and the like. A Walsh transform is particularly suited to pipeline processing inside integrated circuit chips since much of video processing is generally pipeline processing.

Three important parameters of the statistics are the motion estimator statistics, the recovered signal to noise ratio and the initially derived instantaneous and average bit rate from the pre-encoder.

The invention has particular applicability in two major areas: video transmission over capacity limited channels (cable and satellite networks) and video recording on capacity limited media such as CD-ROM and DVD (digital videodisk, sometimes called digital versatile disk).

In the case of multiplexed video bit streams transmitted by cable and satellites, the instantaneous bit rate of the final encoded video of each video bit stream must be limited to some fraction of the channel capacity. In the case where multiple encoded video bit streams are multiplexed into a group of streams, the individual bit streams from each video bit stream of individual channels are controlled such that the bit rate of combined multiplexed bit streams does not exceed the channel capacity.

This is particularly important on the hour, when many or all channels are likely to change from content programming to commercials at the same time, (i.e. field to frame mode) and the instantaneous output encoded bit rate of uncontrolled individual channels would exceed the capacity of the combined channel.

The statistically controlled encoding of each individual channel can be controlled such that, over a GOP, the bit rate of the combined channels does not exceed the capacity limit of the transmission medium (cable or satellite transponder) while simultaneously controlling any picture quality degradation to pre-established limits for each individual channel.

After the pre-encoder gathers the statistics, the filter characteristics of each individual channel can be adjusted by the algorithm of the host processor for that channel, under control of a master processor. The incoming video data of each individual channel can be filtered individually. The filtering can be sufficiently smooth during an appropriate block, frame or frames of the GOP with lessened picture quality degradation than that obtainable from previous single-pass encoding methods, while the bit rate of the output encoded video bit stream is less than that of the combined channel capacity limit.

The situation is similar but slightly different in a fixed media capacity case, like DVD. Here, the total number of bits must be less than the maximum storage possible and the highest bit rate must be less than the maximum allowable (currently 10.3 Mbits). In this fixed media case, the video bit stream filter characteristics are chosen on a block, frame or GOP basis by the host processor algorithm to keep the total number of bits within the preestablished limit while minimizing the picture quality degradation. The picture quality degradation can be distributed over such a wide range of frames, that it is essentially un-noticeable.

Consideration must be given to the effect of changing filter characteristics by block, frame, or sub-block basis, in order to avoid introducing visual artifacts, e.g. scales and the like.

An additional aspect of the invention is the opportunity to define individual channels of a multiple channel transmission system which have different quality levels. For example, an HBO channel carrying a high action movie requires very high quality over almost all the program. An HSC channel (Home Shopping Channel) is composed of essentially static pictures, which require very low compressed data rates over much of the program.

These two examples show the applicability of having tiered quality/data-rate channels. HBO, for example, might be an A channel with guaranteed broadcast quality (52 dB snr) over some high percentage of the program, with no more than a minimum quality, say VCR level, (44 dB snr) for short periods of high activity. This can occur in scenes containing a great deal of fire or water motion, where every pixel may be changing from frame to frame and detail is not generally as important. A chaotic scene, which may otherwise cause the encoder to create unacceptable blocking due to quantizing, can be dynamically controlled by a preselected algorithm stored in the companion processor or memory to limit picture quality degradation slightly in an unobservable manner. Suppliers of programming like HSC on the other hand, may want to pay less for a channel having lower demands on data rate (mostly static scenes) with still acceptable high quality.

Other channels, such as educational TV, lectures, weather maps, satellite photos and the like could use still lower compressed data rates, while maintaining relatively high quality.

The improved tradeoff between compressed data rate and quality provided by the present invention opens up the possibility of multiplexing more individual channels on any given capacity constrained transmission medium, whether cable, satellite or other. The bandwidth taken up by previously used padding bits can be significantly reduced because the dynamic adjustment of filter characteristics smoothes out or eliminates the picture degradation caused by peak data rate spikes which otherwise occur during high action content frames.

Another aspect of the invention is the possibility of replacing any remaining padding bits with useful data, such as INTERNET packets, utility meter data, market data, other relatively time-insensitive data and the like.

In fixed media applications such as video movies on DVD made using prior art techniques, the total bit budget may be exceeded for a particular movie. The facility doing the compression would then be required to manually edit the video content or manually view and adjust compression parameters in order to reduce the total bit count down to the budgeted amount. This is normally done on relatively expensive editing stations at high labor cost.

With the present invention, a specific scene with exceedingly high activity, may have those scenes be dynamically filtered only slightly more than it otherwise would be without noticeable effect on quality. This will permit the manufacturer to fit the movie on the disk without having to pay for manual editing, for additional DVD layers or an additional DVD disk.

Another important aspect of a preferred embodiment of this invention is the MSF pre-filtering of the raw digital image. Prior art filtering of digital images can cause 8×8 blocks of pixels to give the appearance of visual artifacts known as snake scales, it filtering is done poorly. The MSF filtering or compression filtering of this aspect of the invention provides an improved tradeoff of quality level and encoded bit rate over that of prior art techniques.

In one preferred embodiment of the present invention, some statistical parameter inputs to the second MPEG encoder that may be controlled by the host processor include maximum instantaneous encoded bit rate (IBRm), Q (quantization level), padding bits, ME range, VBV values and the like which are known to those skilled in the art.

A signal quality level metric (e.g. SQ, defined later) and other statistical metrics computed from the first encoding may also be used in determining the second encoding conditions.

The processor can be programmed by one having skill in the art, to control the characteristics of the second encoding of the first GOP by setting the allowable output bit rate, and accepting the SQ, or setting the SQ and accepting the output bit rate. If either of the dependent parameters starts to get out of hand, the companion processor may dynamically control the filtering of the video data prior to final compression to bring the dependent parameter back in line.

There are two ways to operate embodiments of the invention: variable bit rates encode and fixed bit rates encode.

In variable bit rate encode, the host processor programming sets the maximum bit rate. In DVD, for example, the maximum bit rate is 10.3 Mbits. A much lower bit rate is desired as an average over the entire disk, e.g. 3.5 Mbits or less. The desired quality level may also be predetermined, e.g. 52 dB. The companion processor then receives values of preselected statistical parameters gathered by the first or pre-encode of the first GOP, and utilizes these statistical values in predefined algorithms to calculate a second set of coding/compression conditions for the second encoding of the first GOP. The second set of compression conditions is supplied to the second encoder, which then encodes the previously stored first GOP. These may include known parameters, e.g. (field1, field2, frame error, vi threshold, VBV value, VBV buffer, vi SQ, and the weighted range of the ME vectors). The second set of compression conditions may also include adjustment of filter characteristics of digital filters applied to the second compression of the uncompressed video data to maintain the average output encoded bit rate over the GOP.

After the values of the predefined statistics are provided to selected registers located in the pre-encoder, these selected register values are read by the host processor. The host processor uses the selected statistics values in combination with inputs from the Video Interface and the Motion Estimator along with programmed system limits: e.g. maximum output bit rate, minimum allowable quality (SQ), and the like. Pre-programmed algorithms stored in the Host computer process the values, inputs and statistics and passes various commands to the optional filter modules, the DRAM controller and output encoder, to encode for a second time the stored digital video data of the frames of the GOP.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein;

FIG. 6-a is a flow chart of the operation of the system depicted in FIG. 6.

DETAILED DESCRIPTION OF ONE PREFERRED EMBODIMENT OF THE INVENTION

Figure 6:
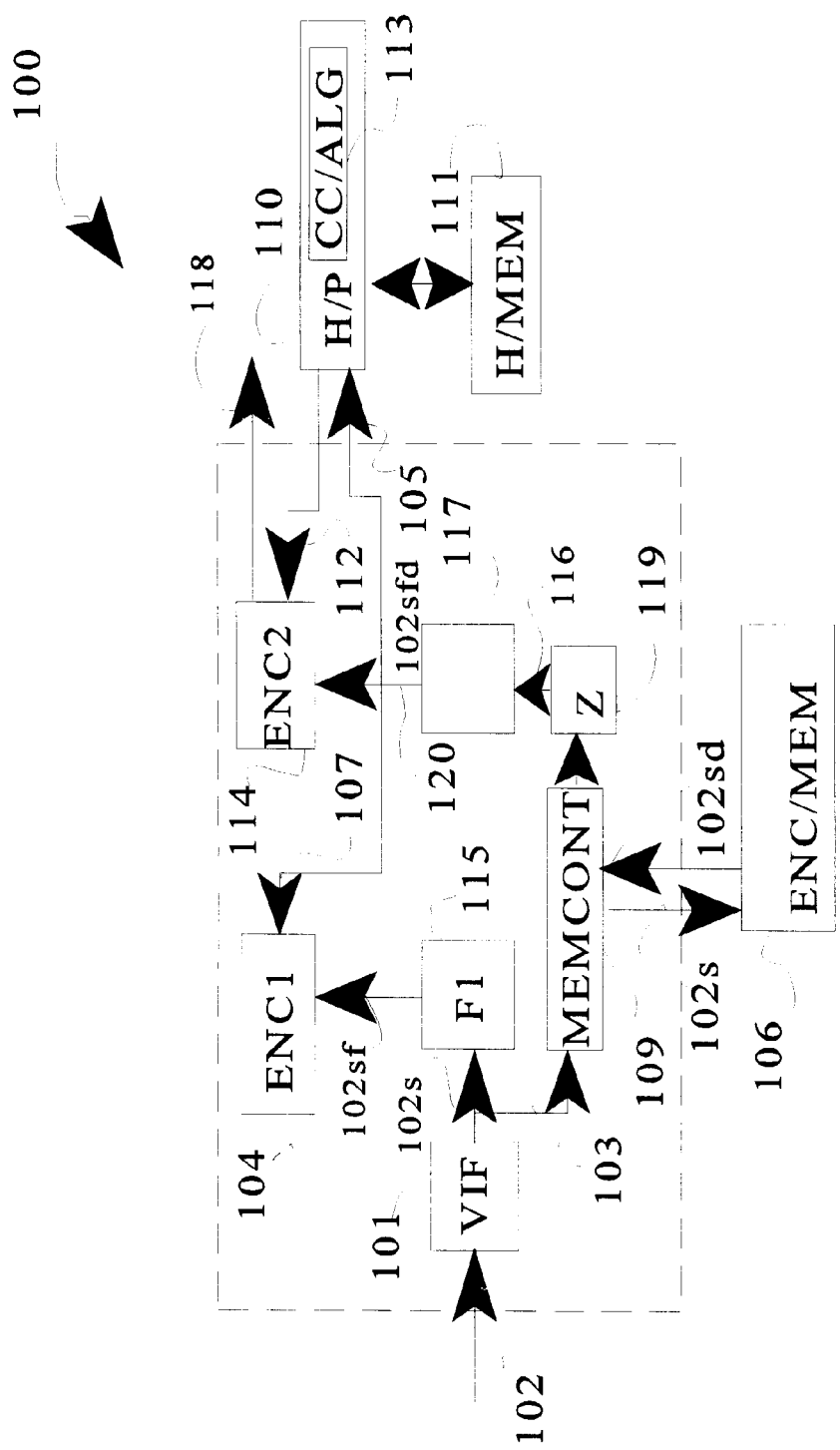
FIG. 6 is a block diagram of one embodiment of the dual encode system in accordance with the present invention.
Figure 6A:
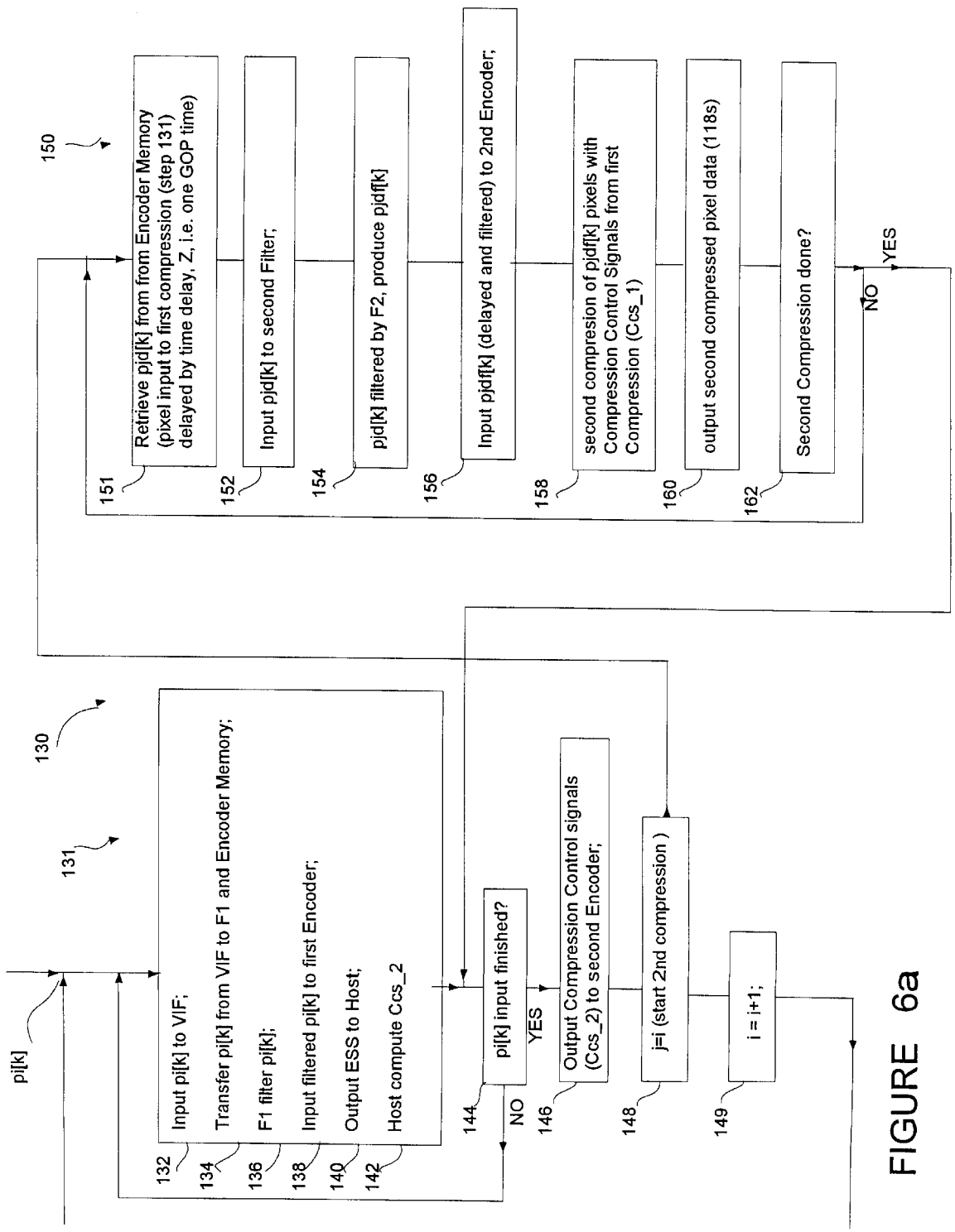
Figure 7:
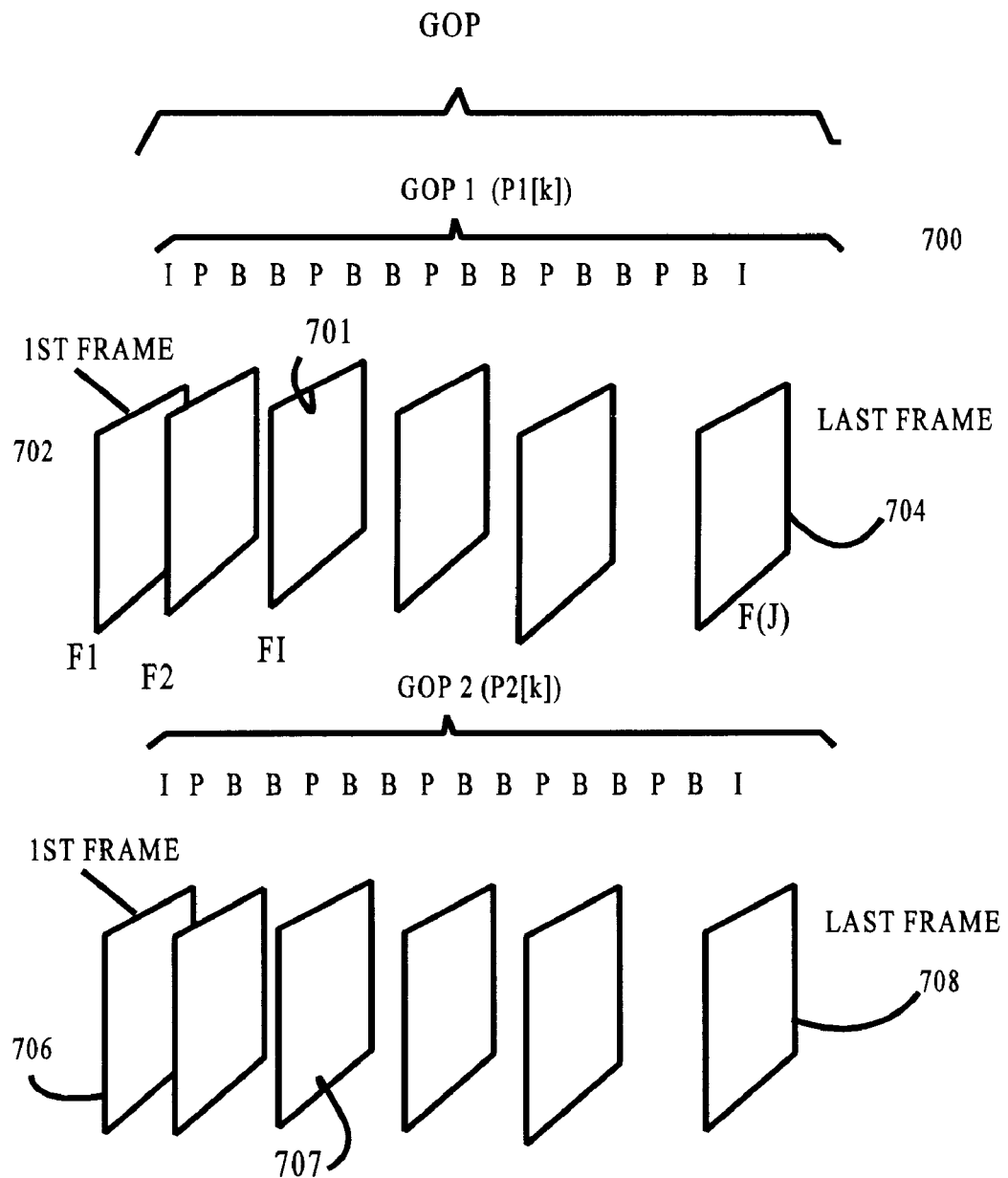
FIG. 7 is a representation of two sequential GOPS operated on in accordance with the present invention.

With reference to FIG. 6 and 6a and FIG. 7, there is illustrated a block diagram of a preferred embodiment of a dual encode system 100 of the present invention. A video signal input 102 is adapted to connect to an uncompressed input video bit stream 102s (digitized input video signal).

With regard to FIG. 7, there is shown one preferred arrangement 700 of the first portion (GOP 1) and the second portion (GOP 2) of uncompressed digitized video input data that is compressed by the method and system of the present invention. GOP 1 is composed of plurality of frames 702 through 704 and GOP 2 is composed of a plurality of frames 706 through 708. The frames 702–704 are input as the first portion of the uncompressed input digital video bit stream 102 and frames 706–708 are input as the second portion of the uncompressed input digital video bit stream 102 described above.

The dual encode system 100 includes a video interface unit (VIF) 101 connected to the video signal input 102. The VIF 101 has a digital output 103 connected to a first digital filter (F1) 115 and a memory controller (MEMCONT) 109. The VIF 101 provides the interface to adapt the uncompressed digitized video input signal 102s to feed a filter F1 115 and MEMCONT 109 through output 103.

The filter F1 115 is a first programmable digital filter, having filter characteristics (not shown) that are capable of being adjusted through connections to an external control (see below) through but 108. Filter F1 115 provides spatial and/or temporal filtering of the uncompressed digitized video 102s from output 103 to feed a first MPEG2 encoder (ENC1) 104 with filtered signal 102sf, a filtered version of the uncompressed video input signal 102s.

ENC1 104 compresses the filtered signal 102sf, over GOP(J), according to a compression process, (ENC1[cp]) described in more detail below, implemented therein. During the compression of the signal 102sf, ENC1 also computes statistical measures Ess1 105. Values of Ess1 105 measures are influenced by the particular ENC1 compression process selected for the embodiment of this invention, the nature of the digital signal 102sf being compressed, and the characteristics of the filter F1.

The statistical measures Ess1 may include instantaneous bit rate, average bit rate over a period, motion vector summations over a period, and the like, or others, as appropriate for the particular encoder implementation chosen for ENC1. The values of measures, Ess1, are communicated to a companion processor HC 110 by a bus connection 108. Ess1 may be sent during the first compression of GOP1, or be stored and transmitted at the completion of GOP1 first compression.

The HC 110 receives the statistical measures ESS1 105 from ENC1 to produce second compression control parameters Ccs_2 (not shown) as a result of computations therein, in cooperation with compression control algorithms (CC/ALG) 113 stored therein and companion memory H/MEM 111. Suitable CC/ALG algorithms may be selected from those generally known in the art. During the first compression of GOP 1, the MEMCONT 109 receives the adapted uncompressed video signal 102s from VIF output 103. The MEMCONT 109 concurrently stores uncompressed signal 102s from VIF output 103 in an encoder memory ENC/MEM 106. At the end of the first compression of GOP1, or later, MEMCONT 109 also retrieves said signal 102s from the ENC/MEM 106. The MEMCONT 109 provides a delayed signal copy 102sd at output 116 of said retrieved signal 102s to a second digital filter F2 117 after a time delay 119 from beginning receipt of the signal 102s. The letter Z indicates time delay 119. Z is generally at least the time required to perform the first compression of GOP 1, or longer.

Both the encoder memory 106 and the host or companion memory 224 may be conventional Drams, static RAMs (SRAMs) or other high-speed memory devices with the requisite storage size, interface characteristics and access time.

The second digital filter F2 is also a programmable digital filter, having controllable filter characteristics (not shown) that are capable of being adjusted through connections to an external control, e.g. HC 110. The filter F2 outputs a filtered signal 102sdf, i.e., of the delayed signal 102sd, through a second filter output 120, to a second MPEG2 encoder ENC2 114.

Encoder 114 receives the signal 102sdf from the filter F2. ENC2 114 also receives second compression control signals (Ccs_2) 112 from the HC 10 at output 112. ENC2 compresses the signal 102sdf and provides a compressed digital video output signal 118s through a video output 118.

The operation of the dual encode system 100 can be understood by first examining the compression of two sequential GOPs, i.e. GOP1 and GOP2, by referring to the diagram of FIG. 6, and the flow chart of FIG. 6-a in combination with FIG. 7. Two contiguous, sequential portions of the uncompressed video input signal 102s are shown as first portion GOP1 and second portion GOP2.

GOP 1 and GOP 2 are compressed sequentially by the two different encoders ENC1 and ENC2 in the dual encode system 100. Each GOP is compressed twice by the system 100, first by ENC1 104 and secondly by ENC2 114.

The sequential nature of the video signal lends itself to pipeline processing. Signal 102s is composed of GOP 1 sequential digital pixel data (pixels) p1[k] followed by GOP 2 sequential digital pixel data p2[k], followed by . . . GOP n pixels, pn[k] (not shown) . . . etc. Pixels p1[k] comprise the pixels of frames Fj (702 . . . 704) of GOP 1 and pixels p2[k] comprise the frames 706 . . . 708 of GOP 2.

Referring to FIG. 6-a, with regard to FIG. 6, there is shown a flow chart of one embodiment of the dual encode process of the present invention indicated generally by arrow 130. A second compression process indicated by arrow 150 follows a first compression process indicated by arrow 131. Compression process 131 is performed by ENC 1 and compression process 150 is performed by ENC2.

Processes 131 and 150 are pipelined processes, in that pixels are processed sequentially according to the particular implementation chosen for the encoders employed, i.e., ENC1, ENC2 and as influenced by the compression control parameters Ccs_1 107 and Ccs_2 112. Reference to FIGS. 6 and 6-a show a slightly difference means of representation. Pixels p1[k] in FIG. 6 are referred to as pi[k] during a GOPs first compression at step 131 of FIG. 6-a, and a pj[k] during the GOPS second compression at step 150. Pixels p2[k] refer to the GOP following the first GOP compressed, whereas pi[k] in FIG. 6-a refers to the first compression of the pixels of a GOP and pj[k] refers to the second compression of the same GOP because j=i as shown in step 148 at the start of the second compression of the same GOP provided by the HC 110 during the processing of a particular GOP. That is, filtering and compression are performed pixel by pixel, block by block or in combination as directed by the particular encoder implementation and control parameters for the current GOP.

The following discussion references sequential pixels pi[k] where the integer "i" indicates the pixels of GOP(i) and i is an integer 1, 2, 3,—n, that is n-sequential GOPs, e.g., GOP(1), GOP(2),—GOP(i)—GOP(n). The behavior and operation of the invention is described in the paragraphs below using only the integer i having a value of 1 or 2. It should be understood that this is equivalent to describing any two successive integers (i) and (i+1).

The pixels p1[k] are input sequentially into the first compression process 131 at pixel input step 132 of dual encode process 130. Pixels p1[k] are received at input 102 as the digitized input video bit stream 102s to video interface VIF. Pixels p1[k] are output at step 134 to filter F1 101 for filtering and to encoder memory controller MEM/CONT 109 for storage in memory ENC/MEM 106.

The pixels p1[k] are filtered sequentially by Filter F1 115 at step 136. Filter F1 provides filtered pixel data p1f[k] to encoder ENC1 at step 138. Encoder ENCI performs a first compression of the pixels p1f[k] at step 140. ENC1 also outputs statistical measures Ess1[k] 105 computed thereby to HC 110 at step 140. Ess1[k] 105 may be output in parallel with the first compression, or stored and output at the completion of first compression.

The HC 110 utilizes receives the Ess1[k] 105 from the ENC1 104 with the stored CC/ALG 113 at step 142. The HC 110 also computes and stores compression control signals Ccs_2 (expressed alternatively as Ccs(i+1): that is, the control signals supplied at output 112 to be used by ENC2 for the next compression 150 of the pixels pi[k] after the delay Z 112 at step 142. HC 110 computation and storage may be pipelined or be in parallel with receipt of said Ess1[k] signals. Ccs(i+1) signals 112 are used later in conjunction with the second compression 150 of the delayed pixels p1df[k] of GOP 1 by the second encoder ENC2.

Concurrently with the steps of the first compression 131 (i.e. input, storage and first compression steps 132 to 140 performed on p1f[k] of GOP 1), the previous GOP, e.g. GOP 0 (not shown) is compressed by the steps of second compression 150 by the second encoder 114. For the purposes of the description of the operation of the flow chart 130, the compression of GOP 0 may be ignored.

Completion of the first compression of all the pixels of GOP 1, that is, the steps 132 through 142, is tested at step 144. If the GOP 1 has not completed processing, the system 100 returns to Start and continues processing GOP 1, i.e., the filtered pixels p1f[k] input pixels through the first compression 131 at step 132. If all the pixels of GOP1 have been processed, step 144 transfers control to send the accumulated results of computations of Ccs_2 to the ENC2 at step 146.

An important advantage of the present invention is provided when the pixels p1f[k] of GOP 1 have completed compression by ENC1 and storage by ENC/MEM 106.

Knowledgeable persons having skill in the video compression art, will recognize this invention enables one to counter unacceptable or undesirable results of the ENC 1 compression of the pixels of GOP 1 by providing specific algorithms (not shown) in the CC/ALG 113 algorithms processed by HC 110. Selected CC/ALG algorithms can revise, change and adapt the filtering, encoding, and compression algorithms for the second encode 150 of GOP 1 by ENC2 by supplying updated compression parameters for the second encode 150, e.g. the Ccs_2 (or alternatively expressed as Ccs(i+1) 112, Such algorithms for correcting or eliminating specific compression problems are known in the art. Previously, such corrective algorithms were implemented off line by operators viewing and correcting video by editing, or by manually selecting problematic portions of video for reprocessing with different sets of manually selected compression control parameters or filter characteristics.

Since the present invention accumulates statistical measures Ess(i) of the first compression process (ENC1), it provides a capability for adjusting second compression parameters Ccs(i+1) to address problematic compression results by using the results, i.e., Ess(i) generated by the first compression 131. Problematic compression results are detectable by the HC 110 processing the algorithms CC/ALG 113 with the statistical measures Ess(i) gathered during the first compression of GOP 1 by ENC1.

After the HC 110 transfers the Ccs(i+1) to ENC2, the second compression process 150 is initialized (j=I) to begin processing the delayed pixel data from GOP 1, p1d[k] at step 148. The MEMCONT 109 and ENC/MEM 106 start retrieving the delayed version, p1d[k] of the previously stored pixels p1[k] at step 151 and begin input of said pixels to the second filter F2 at step 152.

Second filter F2 filters the delayed pixels, p1d[k], at step 154 with the modified Ccs(i+1) from step 146. Second filter F2 provides the delayed and filtered pixels, p1df[k] of GOP1 to the second encoder ENC2 at step 156. Encoder ENC2 starts receiving the Z-delayed p1d[k] pixels (the previously stored p1[k] pixels) and begins the second compression process 150 on GOP 1 at step 158. Note that the second compression 150 of the pixels of GOP 1 by ENC2 has been delayed by the time, Z, required to perform the first compression 131 of GOP 1.

The second compression encoding by ENC2 is performed at step 158 as influenced by the Ccs(i+1) received from the HC 110 at step 146. Ccs(i+1) is the results of the evaluations of the Ess(i) computed on the first compression of the pixel data now being compressed the second time by ENC2. Second compression video output data, is output by ENC2 at step 160, as the compressed video output signal 118s. The second compression process 150 on the pixels p1d[k] of GOP 1 continues until the second compression 150 is evaluated as complete at step 162. At this point, control is transferred back to step 144, which evaluates whether the next GOP, that is GOP[i+1]=GOP[2 ] has finished the first compression.

Control transfers then to step 146 where the cycle of first compression of GOP 2 by process 131, followed by second compression of GOP 2 by process 150 begins again.

Step 149 returns to START at step 132 where the system 100 begins inputting the pixels p2[k] of GOP 2 into the first compression process 130 for the first compression of GOP 2; i.e. the GOP counter [I] is incremented by one. The compression process proceeds again with GOP 2 taking the place of GOP 1, and GOP 3 replacing GOP 2.

Figure 8:
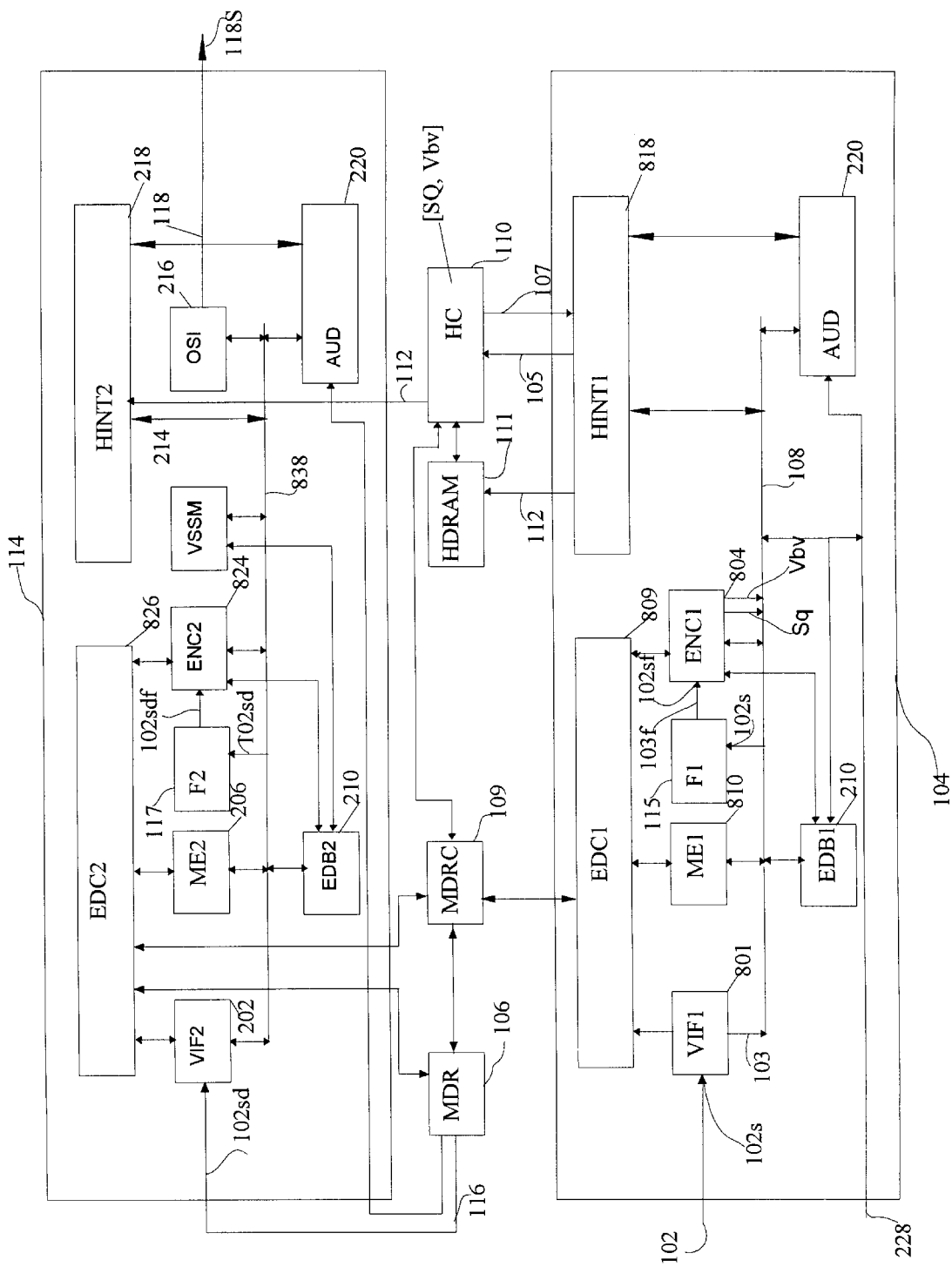
FIG. 8 is a block diagram of one embodiment of a dual encode apparatus in accordance with the present invention.

With regard to FIG. 8 a hardware view of the compression process 130 of the present invention is shown. Uncompressed digitized input video signal 102s from GOP 1 is input to a first video interface (VIF1 801) of the first or pre-encoder 104. The digitized video input bit stream 102s (pixel data pi[k]) is processed by the VIF1 801 and passes concurrently an encoder memory 106 (e.g., a Main Dram (MDR) through a memory controller 809. VIF1 simultaneously inputs signal 102s to encoder memory 106 through (Memory Controller 809) and Motion Estimator (ME1) 810 of pre-encoder 104. Bit stream 102s also goes through a first filter F1 815 to the first MPEG encoder Encode Pipe 1 (ENC1) 804. The VIF1 801 may be a standard digitized video interface known to those skilled in the art, such as that specified in CCIR 601, now known as Recommendation ITU-R BT.601 by the International Radio Consultative Committee.

ENC1 104 performs a first MPEG compression Process 131 on the pixel data of GOP 1 (p1[k]) while the same pixel data, p1[k], of GOP 1 is concurrently stored in memory MDRAM 106. Encode Pipe 1 804 performs a first compression on the digitized video 102s from GOP 1 using a first set of compression encoding parameter (Ccs1) obtained from host or companion memory 111.

In a preferred embodiment of the invention, the pixels pn[k] (i.e. GOP 1, GOP 2, . . . GOP n . . . ) of input video bit stream 102 are filtered by filter F1 115 before the first encode by encode pipe 804 104. As encode pipe 804 104 performs the first compression process 131, on the pixels of GOP 1, the first encoder 104 also is concurrently generating and outputting a corresponding first set of encode compression statistics signals (Ess__1) 105. Ess__105 to a companion processor, e.g. host computer (HC) 110 and host or companion memory 111 through a connection (bus) 180 and Host Interface (HINT) 818.

The compression process 131 is performed by encode pipe 804 with the first step of compression control signals (Ccs(i)) 107 received from the HC 110. Ccs(i) signals 107 are supplied by the companion memory [H/MEM] 111 to the HC 110. Ccs(i) 107 are selected to optimize the first compression process 131 under the expected conditions, as is well known in the art.

The first set of compression control signals Ccs(i) for GOP 1 are preferably supplied from the H/MEM 111 under control of the HC 110 and are made available to the ENC1 prior to the beginning of the compression process process 131.

ENC1 is arranged to have sufficient processing resources to perform video compression of the pixels p1[k] in real time at the incoming data rate. ENC1 may be a commercial MPEG processor known to practitioners of video compression design and implementation.

The following discussion references sequential pixels pi[k] where the integer "i" indicates the pixels of GOP(i) and i is an integer 1, 2, 3,—n, that is n-sequential GOPs,e.g., GOP(1), GOP(2),—GOP(i)—GOP(n). The behavior and operation of the invention is described in the paragraphs below using only the integer i having a value of 1 or 2. It should be understood that this is equivalent to describing any two successive integers (i) and (i+1).

During the compression 131, ENC1 is generating and outputting the Ess(i) signals 105. The signals Ess(i) 105 are those statistics specific to the type of encoder utilized in the system 100. Typical encoder compression statistics are shown in literature and technical publications available from technical societies. HC 110 concurrently operates on the first set of signals Ess(i) 105 coming from ENC1 104 during the compression process 131. The host computer 110 operates on the Ess(i) signals according to compression control algorithms (CC__ALG) 113 previously stored or encoded in the HC 110. References to known compression control algorithms are available in technical publications and related technical literature. While ENC1 104 is completing the first compression process 131 of GOP 1, the host computer 110 computes a corresponding second set of output compression control signals Ccs(i+1) 112 using the information from the Ess(i) 105 in conjunction with the CC/ALG 113. The HC 110 stores the Ccs__2 in the H/MEM 111. The first compressed video data produced by Encoder-1 is ignored.

At the completion of the compression process 131, and prior to beginning the second compression of GOP 1, the HC 110 provides the Ccs__2 112 to a second (or output) compression encoding device ENC2 114, e.g. another MPEG-2 compression chip or circuit. After the first encoding of GOP 1 is complete, a time-delayed representation (time delay, Z) of the digitized data of GOP 1 stored in the memory 106 is transferred through bus connection 116 to a second video interface (VI2) 820 of the second encoder 114.

The second set of parameters Ccs-2 is used by the associated blocks of the second encoder 114: i.e. VIF2 202, ME2 206, ENC2 824, EDB2 210 to perform a second compression on the Z-delayed version of the digitized data of GOP 1.

The output Encode Pipe ENC2 824 acts as a final or output encoder for the time delayed copy p1d[k] input at connection 116 of the previously stored pixels p1[k] of the frames F[j] of GOP 1. The delayed copy 116 is provided by the MEMCONT 109 from the stored pixel values p1[k] in the ENC/MEM 106 and is delayed by a time delay 119 represented by the letter Z.

During the transfer and second compression/encoding of the previously stored and delayed data of GOP 1 by Encoder 2 114 , the first Encoder-1 104 is receiving and processing a second portion of digitized input video data, i.e. GOP 2 through the video input 102. As the second compression of the delayed data of GOP 1 is being performed by Encoder 2, using the second set of compression encoding parameters Ccs-2, final compressed video data derived from GOP 1 is output by Encoder 2 114 through Output Stream Multiplexor 2 (OS12) to output 118.

The second compression process (step 150 of FIG. 6) of the video data from GOP 1 thus can take full advantage of the statistical metrics, Ess(i), gathered over the entire GOP, not just a fraction of the GOP which precedes compression of the portion of the GOP following the fraction.

A default value for the time delay, Z, is the time required for ENC1 to compress the pixels of GOP 1, and output the Ess(i) data 105 to the HC 110. In some preferred embodiments of this invention, the time delay, Z, is exactly equal to the time for ENC1 104 to process the un-delayed pixels, p1[k], of GOP 1.

Figure 1:
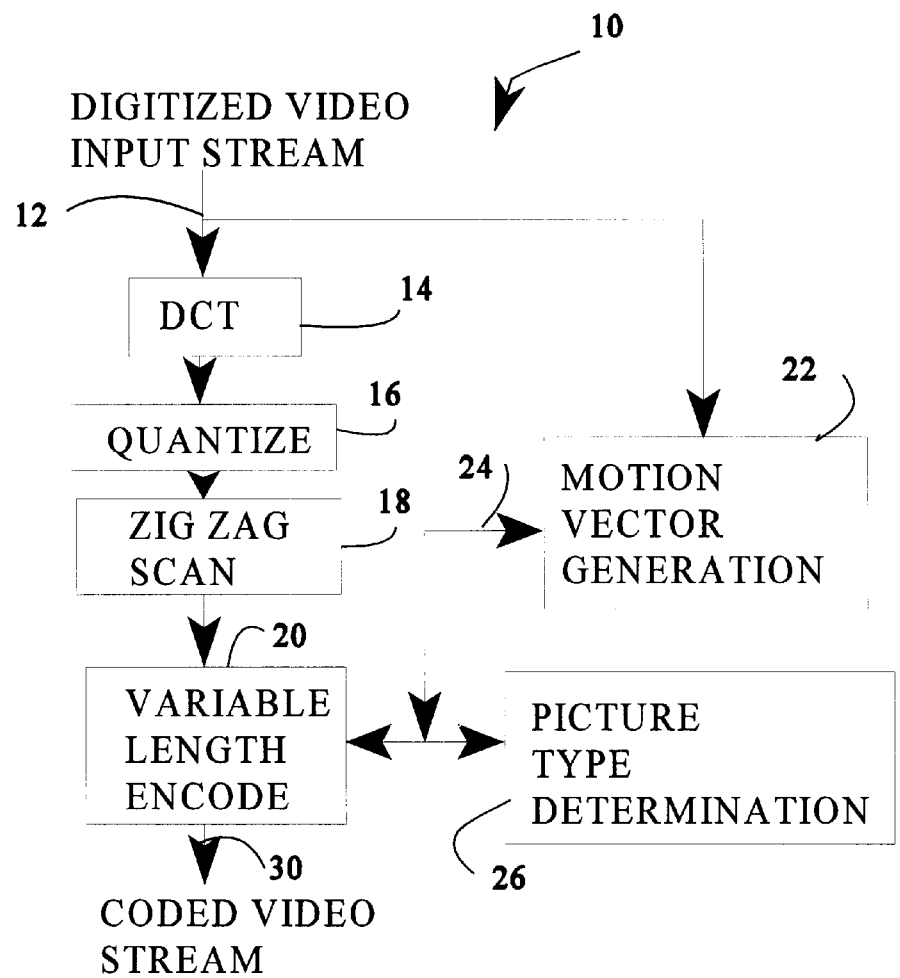
FIG. 1 illustrates a simplified block diagram of an MPEG-2 encoding process.
Figure 2:
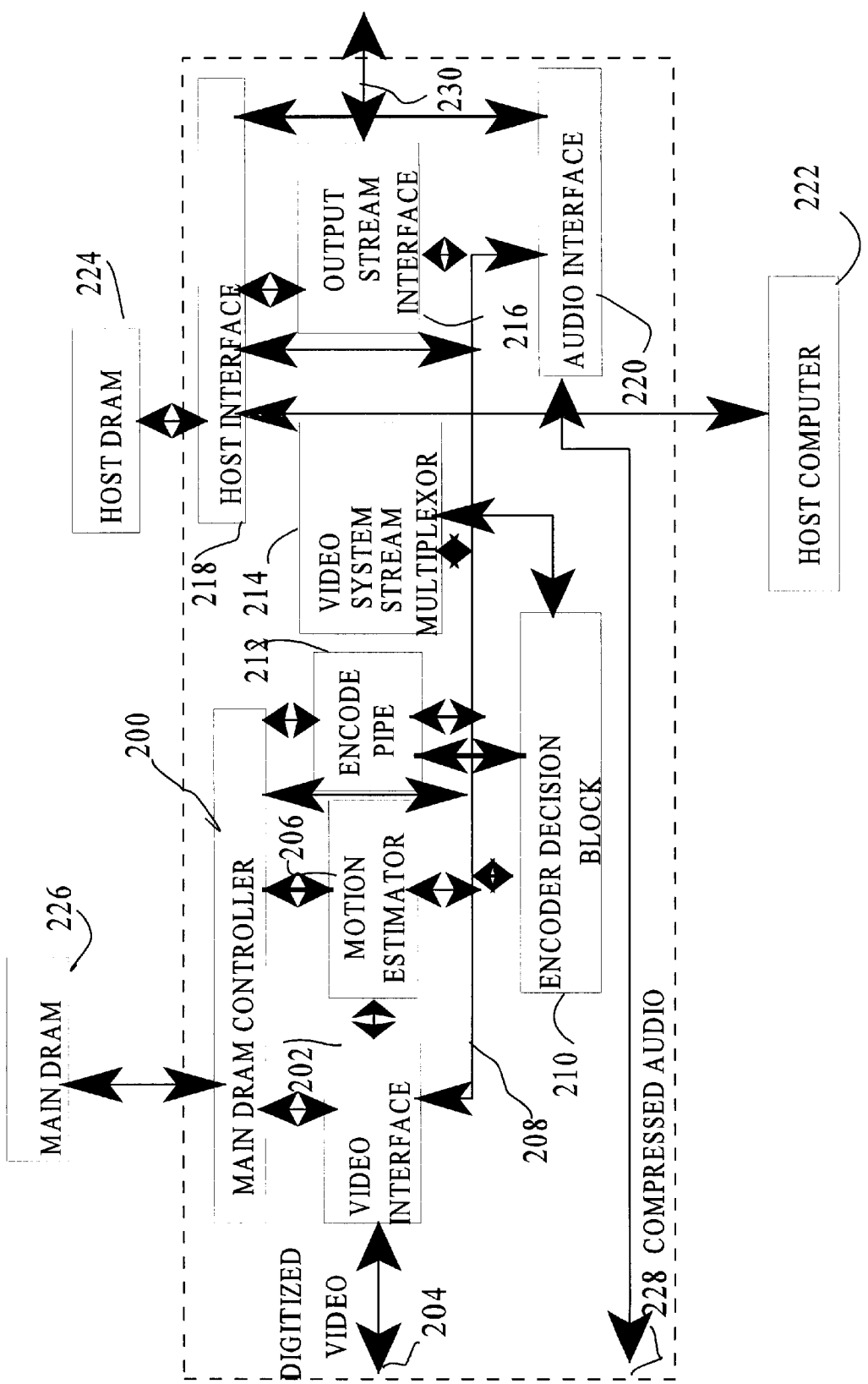
FIG. 2 is a block diagram of an exemplary MPEG-2 Encoder.
Figure 3:
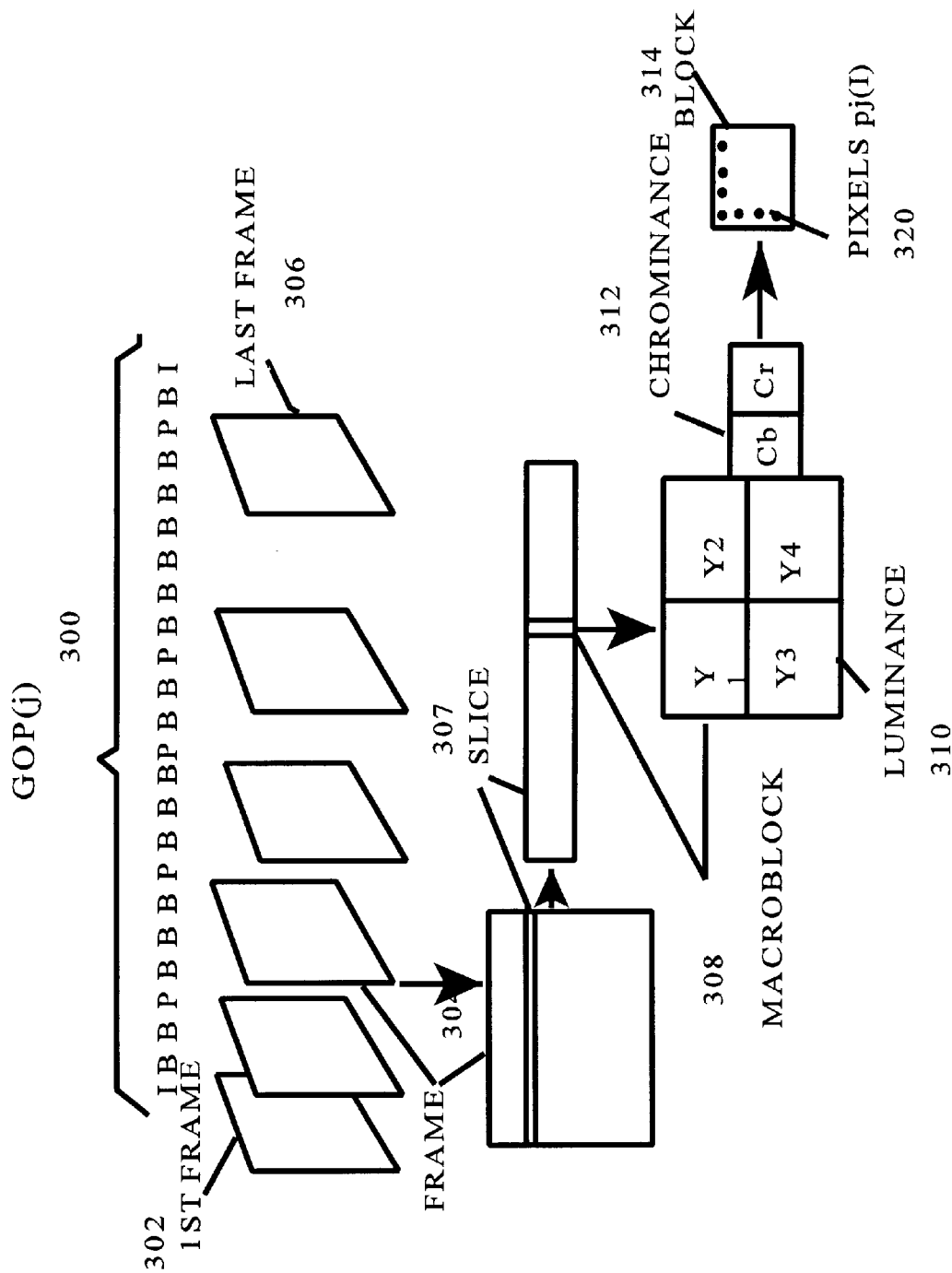
FIG. 3 depicts an example of MPEG-2 video image coding format using the 4:2:0 protocol.
Figure 4:
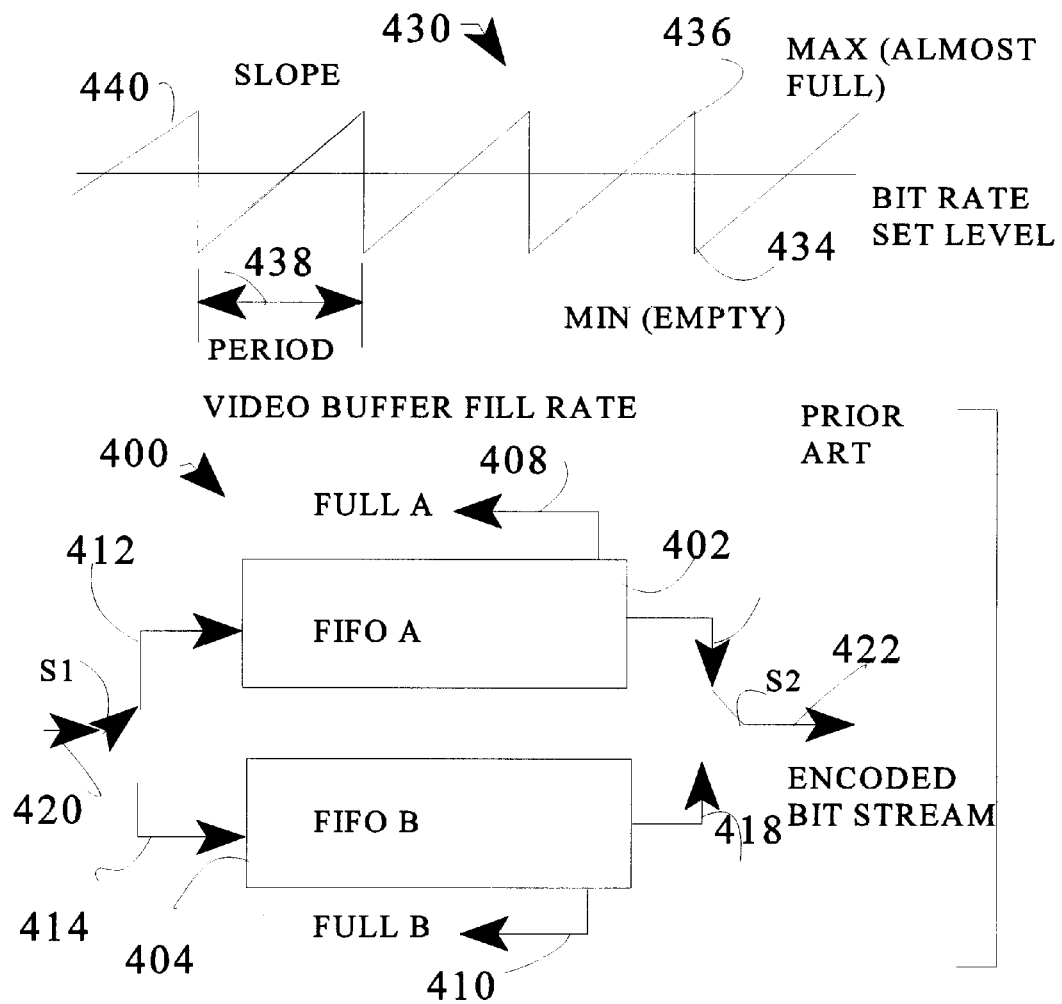
FIG. 4 is a diagram of an exemplary MPEG-2 video buffer and the associated encoded bit rate.
Figure 5:
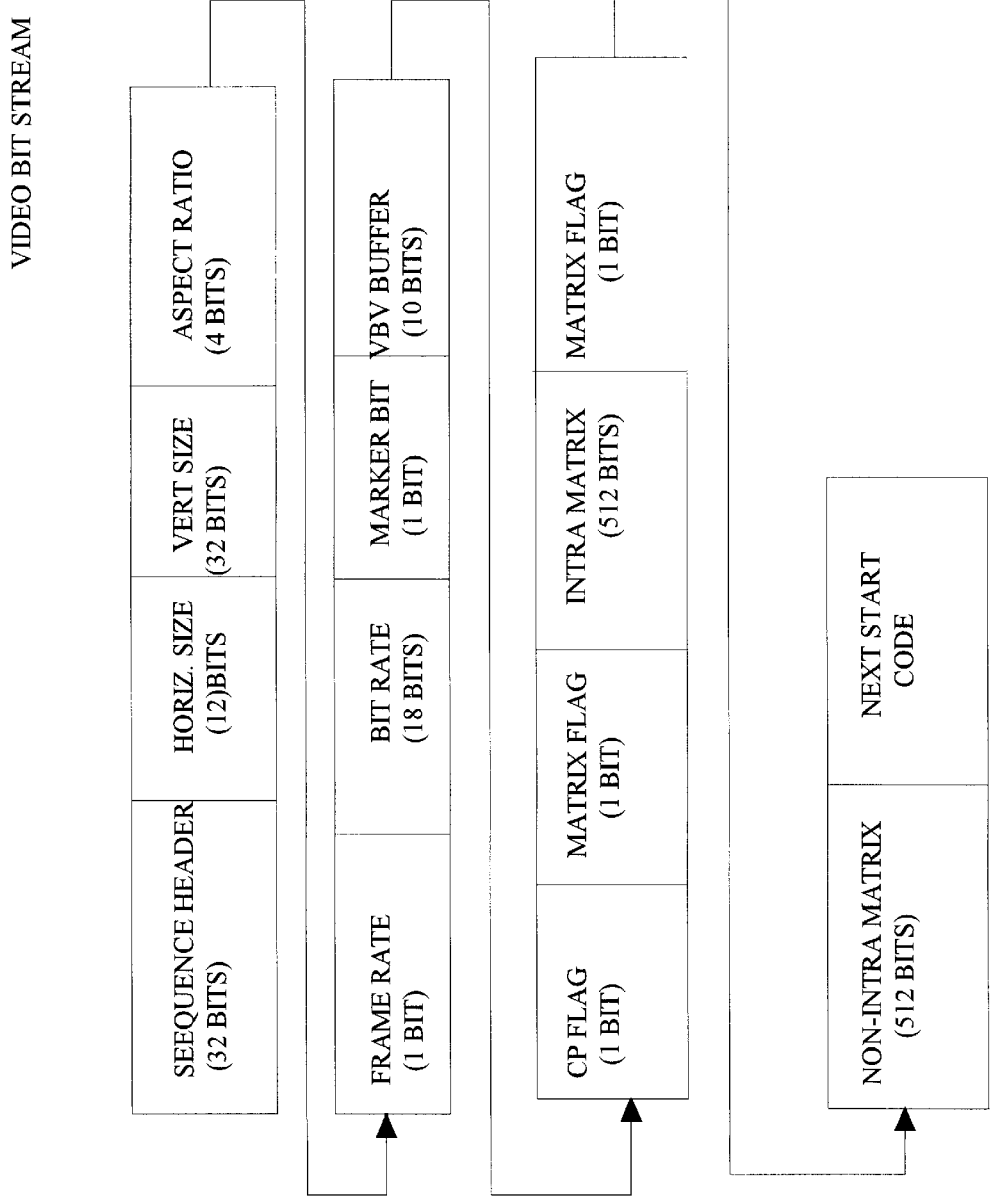
FIG. 5 illustrates part of the encoded MPEG-2 video bit stream structure.

The delay time, Z, may be the same as or longer than the time for ENC1 104 to compress the pixels of GOP 1. One or more FIFO buffers (FIG. 4) may be used in either or both the input bit stream 102 and delayed and filtered bit stream 120 to accommodate unequal processing rates by ENC1 and ENC2.

After GOP 1 has been compressed by ENC1 and stored in ENC/MEM 106, the first compression process 131 is complete. At the completion of the first compression of GOP 1 by ENC1 104, the transfer of Ess(i) data 105 to the HC 110 is also complete, and the computed Ccs(i+1) 112 signals are provided to ENC2 114 by HC 110. The pixel data p1[k] stored in ENC/MEM 106 is read out as the Z-time delayed copy of pixel data (p1[k]d) 116 and is directed to ENC2 114 through filter F2 119 therebetween.

The filter F2 825 filters the delayed pixels p1d[k]d according to new F2 filter parameters (not shown) selected by the HC 110. The filter F2 outputs a filtered, still uncompressed video bit stream p1d[k] 120 to the second ENC2 824.

This provides an advantage to the second compression of the pixels of GOP 1, in that, the entire GOP 1 has been previously been compressed by ENC1 104 and evaluated by the CC/ALG 113 stored in the HC 110. Thus, the second set of compression control signals Ccs(i+1) is selected by the operation of the algorithm, CC/ALG 113, to improve the results of the second compression process 150.

Algorithms CC/ALG 113, for computing new filter characteristics for specific implementations of the filter F2 117, and selecting new encoding parameters 112 for the ENC2 114, based on the results of the first compression process 131, of GOP 1 are capable of being developed by one having normal skill in the video compression art.

The fact that the outcome of the first compression the entire GOP 1 by ENC1 104, are known prior to beginning the second encoding of the delayed GOP 1 provides one of the major advantages of the dual encode process and system of this invention. This is achieved by using the more complete knowledge derived from the complete first encoding of GOP 1 to be used for a second encoding of GOP 1. This is an improvement over prior art video compression systems, in which there is only one real-time encoding pass per GOP.

The delayed signal copy p1d[k] at input 116 of input signal 102s is the same uncompressed digitized video data as the p1[k] data, merely shifted in time. The second filter, F2, also provides another advantage to the present invention, in that, the characteristics of the filter F2 may be altered by the HC 110 during the second compression process 150 of the GOP 1 pixel data, based on the results of the evaluation of Ess(i) 105 and CC/ALG 113. The second compression of the delayed GOP 1 pixel data can thus be improved in two ways over prior art compression systems; by altering the compression parameters Ccs(i+1) of the ENC2 during the second encoding of GOP 1; and by providing filter characteristics to the filter F2 to improve the characteristics of the delayed and filtered pixels p1d[k] going to the second compression encoder pipe ENC2 824 (FIG. 6).

The second encoder 114 then outputs a final compressed output video bit stream p1[j]-o of GOP 1 at output 118 to ancillary circuitry (not shown) which follows; e.g. a transmission channel, a DVD recorder or the like.

Compression control algorithms CC/ALG 113 stored in the host computer 110 provide the second set of output compression control signals, Ccs(i+1) through connection 112 to the ENC2. Persons having skill in the art will appreciate the opportunity thus provided to design compression algorithms, e.g., CC/ALG 113, which will improve one or more of the compression characteristics of the compressed output 118 relative to prior art single compression processes.

The HC 111 may also control the additional filter F1 for performing modified filtering to the following GOP 2. The filtering applied to the GOP 2 original video input data 102s (p1[k]) from input 102 through VIF1 801 by filter F1 may be different from that applied by filter F1 115 to the original video data p1[k] of GOP 1.

Concurrent with the outputting of the final compressed digital video output data at output 118 obtained by the second compression of GOP 1 by the second encoder 114, the first encoder 104 is receiving and performing a first encoding of the pixels pj[k] of GOP 2 of uncompressed video bit stream 102. Concurrently, the MEMCONT and ENC/MEM 106 are storing a copy of pj[k] of the input video bit stream 102.

Simultaneously with the first encoding (compression process 131) of the second GOP (GOP 2) the first encoder 104 is outputting a second set of first compression statistical signals, ESS2 to the HC at input 105, based on the first compression of the pixels of GOP 2, pj[k], from the VIF1 801.

When the output encoder 114 finishes the second compression (compression process 150) of the GOP 1, the HC 110 inputs the new second set of compression control signals, ESS2, derived from the first compression, (compression process 131), of the second portion (GOP2) of input video 102 through the connection 112 to the second encoder 112. The second encoder then performs a second compression encoding on the delayed version of the previously stored second portion of the input video signal 102s.

One of the great advantages of the present invention is the essentially unlimited options available to compensate for undesirable compression outcomes caused by the characteristics of the incoming video bit stream. An arbitrarily large data set of algorithms to compensate for undesirable video compression artifacts or condition features may be accessed by the host computer 110 from the host DRAM 111.

Figure 9:
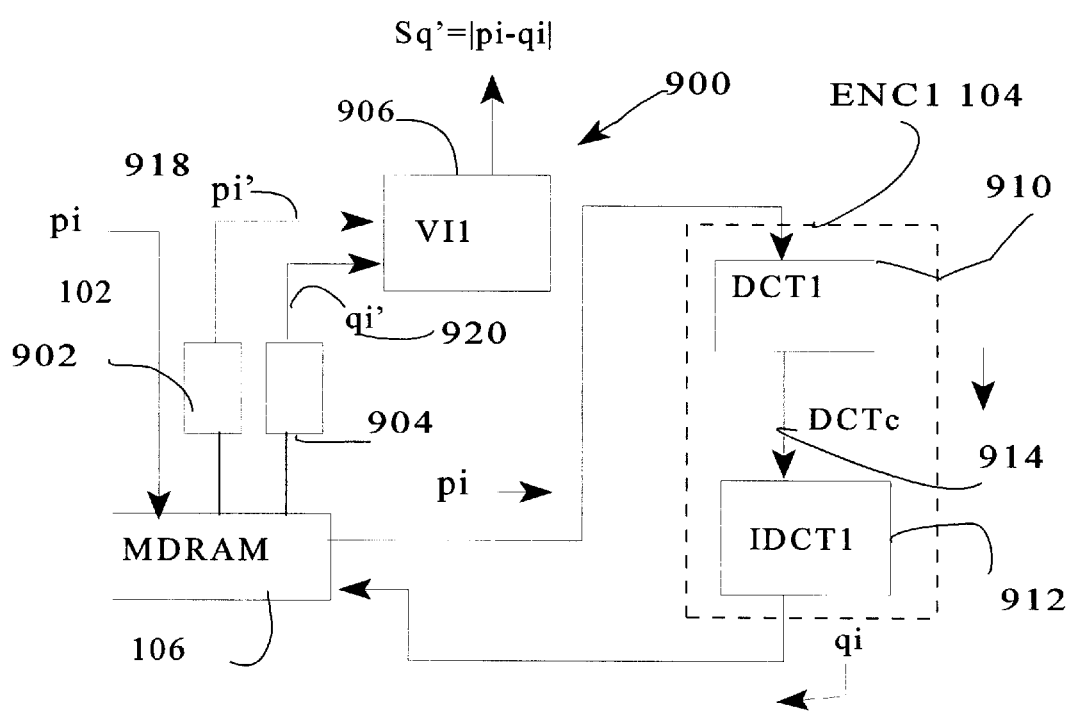
FIG. 9 is a flow chart of one embodiment of the dual encode method of the present invention.

Referring to FIGS. 7 and 8 in combination with the simplified circuit block diagram of FIG. 9, the overall operation of part of a preferred embodiment of MPEG 2 compression system 800 in accordance with the present invention is shown. The pipelined circuit 900 is used to derive one statistical metric, SQ, for a preferred embodiment of the present invention.

During the first compression of one of the frames, Fj, of GOP 1 by the Encoder-1 104 of FIG. 8, pixel data, p1[k] (FIG. 9: pi represents p1[k], qi represents q1[k]), from each pixel of the frame, Fj, of GOP 1 is provided by input line 102 to be stored in the encoder memory ENC/MEM 106, which may be part of a larger Main Dram (not shown).

The pixel data, p1[k], can be represented as an array [Pk] of pixels comprising the frame, Fj. The pixel data, p1[k], may also be received by the differencing circuit block VI1 906 and processed, preferably in blocks, as before by ME1 908 and ENC1 104. The Encoder-1 includes a first pipelined DCT means, DCT1 910, and a first pipelined inverse DCT means, IDCT1 912. DCT1 generates DCT coefficients, DCTc 914, from the pixel data, p1[k], for all the blocks of the frame, Fj. The DCTc 914 coefficients from pixel blocks of the frame, Fj, are passed to the IDCT1 and converted back into computed pixels, q1[k], corresponding to the original pixels, p1[k].

The computed pixel values, qi, are passed to the encoder memory ENC/MEM 106 for storage and retrieval. Suitable buffers, such as FIFOs 902 and 904 (FIG. 4), are arranged to temporally align delayed original pixels, p'918, with corresponding delayed computed pixels, q'920 and passed to the differencing circuit VI1 906 from the encoder memory ENC/MEM 106. A pixel by pixel comparison over the frame, Fj,is made by the VI1 906 which outputs the absolute magnitude of pixel differences |pi-qi|=sq[i]. Sq[i] is transferred through the H/INT 808 to the HC 110 and accumulated over all the pixels of the frame Fj as [sq[i]=Sqj (the absolute magnitude differences between the original pixels pi and the computed pixels qi, summed over all the pixels of the frame,j), and stored in the H/MEM 111 as the quality metric Sqj for the frame,j).

After completion of the first encode of GOP 1, i.e. all the frames, the HC110 will have a set of values, [SQ] of the SQj parameter for each frame, Fj, of the GOP. In a preferred embodiment of the present invention [SQ] is used by the HC 110 along with values of other suitable statistical metric values to compute the second set of compression parameters to be used by the second Encoder 2 (FIG. 8) when performing the second compression of the frames of GOP 1.

For example, in video scenes with few features and little motion, the pixel differences |pi-qi| will be small or zero. In other frames with great detail and/or very fast motion, some or all of the |pi-qi| elements of [SQ] will be large, thereby accumulating large values of [SQ].

The HC 110 is provided with an array of predetermined limit values, [Sqm]. After receiving the array [SQ], HC 110 compares [Sqm] with [SQ]. With small values [SQ] compared to [Sqm], the HC 110 can increase the bit budget of the output video bit stream for following frames of the GOP of interest, leading to higher quality of the pictures being transmitted or stored.

In the opposite case, when [SQ] is large, and greater than [SQm], the HC110 is programmed to use the stored algorithms to apply different filter or second compression control parameters. For example the HC can change the quantization for the second encoding of GOP 1 by Encoder 2, in order to bring the associated bit rate or bit quantity back within the bit budget. Alternatively, digital filters F1, F2 may be provided and controlled by the HC 110 to have digital filter parameters changed to reduce the number of DCT coefficients required to model the filtered video data, and thus a lower compression bit rate or bit quantity. Refer to step 154 of FIG. 6-*a*.

In addition, digital filters F2 having filter parameters controlled by the HC 110 may apply different spatial filtering over different blocks, macro blocks or frames. Alternatively, temporal filters that are known in the art may be applied by filter F2 using pixel data from blocks of current, previous and following frames.

Other quality metrics known in the art may be used in addition to or in place of the SQ metric. Alternate quality metrics may have upper or lower limits or both upper and lower limits. Algorithms for controlling compression conditions for specific encoders are known by those familiar with the art.

Referring again to FIG. 4 and FIG. 8 with regard to an alternative embodiment of this invention, another useful statistical metric may be derived from the behavior of a video buffer present in the Encoder-1 and applied by the system and method of the present invention. Some or all of the values of the periods 438 (Tff) of switching between FIFO A and FIFO B may be measured by counters (not shown) provided in the ENC1 104 of Encoder-1. The values Tff 438 are transmitted by connections between the active blocks, i.e. VI1 906, ME1 810, ENC1 104, and EDB1 to the HINT 818 and subsequently to the HC 110 for accumulation over the frames of GOP 1. HC110 again, uses the values of Tff 438 along with other statistical metrics and the CC/ALG 113 to compute or retrieve the second set of compression encoding parameters Ccs(i+1).

The HC 110 is provided with predetermined stored programs, i.e. CC/ALG 113, (in the case of microprocessor controlled systems), programmable logic circuits or hard wired circuitry that supply such compression control inputs to the Encoder 2 for compressing the first GOP 1 the second time.

Data for other statistical metrics familiar to those skilled in the art may be gathered from Encoder-1 during the first encode of the first GOP 1 and supplied in the same fashion during the second and final encode of GOP 1 by the Encoder 2. The advantage this invention provides is the capability to look at the results of compressing the entire GOP 1 before final compression, i.e. by ENC2, decisions have to be made regarding the final compression parameters, (e.g. quantizing), the filtering to be applied (e.g. how much and whether to filter a particular block, macro block or frame and whether to use spatial, temporal filtering or whether to use both.

The process and apparatus of the present invention has been described with regard to two successive GOP s. It is clear that more than two GOP s could be used to accumulate data on the statistical metrics observed during the first compression of the first GOP before the final compression of the first GOP at a cost of more memory. As memory components become cheaper, two, three or even more GOP s may be stored and passed through the first encoder before providing the second set (or sets) or encoding compression parameters Ccs(i+1) to be used on the second and final compression of the first GOP s.

While the foregoing detailed description has described embodiments of the present invention, it is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention.

For example, a plurality of additional first encoders may connected to the uncompressed video input and may have corresponding additional sets of first encoding conditions and be arranged to output additional statistical metric values based on the first encoding of the first GOP The additional statistical metric values may be used to compute additional compression conditions for the second compression of the first GOP.

The same structure and process of a first encoder producing a plurality of first compression statistical metric values from a first compression of an uncompressed digital data stream, and subsequently providing the first metric values to a second encoder for a second compression of a delayed version of the first uncompressed data stream and subsequently outputting the second compressed video bit stream with improved compression results. For example, the present invention may be applied to digitized audio signals.

Motion steadying digital filters may also be included in additional embodiments of the present invention. For example, a motion-steadying filter for filtering the first uncompressed digital data set prior to storing the first uncompressed digital data set in the first RAM may be included prior to the first encoder. This will reduce the MPEG-2 extra bits otherwise caused by the effect of image walking prior to first encoding.

The input digital data may also be presented and processed in a protocol comprised of time sequential groups of parallel data sets rather than a serial protocol.

Non-Video Applications of the Dual Encode System

The dual encode process of this invention may also be utilized in non-video applications. For example, compression of digitized audio bit streams (compressed audio 832, 834 in FIG. 8) of voice or music may be advantageously compressed by audio compression systems incorporating some or all of the features of this invention. Many more channels of audio may be encoded on media of fixed size by the improved quality/compression trade-offs enabled thereby. Compression of weather or other geophysical data prior to transmission between remote and central stations using features of this dual encode system can yield increased data rates over fixed channel bandwidths. Many more applications will be apparent to those having an understanding of the benefits provided by the present invention. Thus the invention is to be limited only by the claims as set forth below.

What is claimed is:

1. A digital data compression system for compression encoding a digitized input data set, the digitized input data set including a first uncompressed digitized data set, and a second uncompressed digitized data set, an encoding system comprising:

a first compression encoder having an input adapted to receive the digitized input data set, the first compression encoder capable of performing a first compression encoding of the first uncompressed digitized data set;

an encoding metric output from the first compression encoder adapted to output a first compression encoding metric derived from the compression of the first uncompressed digitized data set, a first memory connection adapted to input the first uncompressed digitized data set to a first memory while the first uncompressed digitized data set is being compressed by the first compression encoder;

a second memory connection adapted to receive from the first memory, a time delayed version of the first uncompressed digitized data set, delayed by a delay time, Z;

a second digital compression encoder having an uncompressed data set input adapted to receive the Z-delayed version of the first uncompressed digitized data set from the memory output, and an encoder condition input adapted to receive the one or more second compression encoding conditions derived from the first compression encoding metric, the second digital compression encoder configured to perform a second compression on the Z-delayed version of the first uncompressed digitized data set using the one or more second compression encoding conditions to produce thereby a compressed output digitized data set.

2. In the digital data compression system of claim 1, in which the second compression encoding conditions are established to constrain the maximum encoded bit rate of the second compressed output digitized data set equal to or below a predetermined maximum bit rate value, the second digital compression encoder adapted to utilize the second compression encoding conditions to output the second compressed output digitized data set with the maximum encoded bit rate equal to or below a predetermined maximum bit rate value.

3. A digital data compression system as set forth in claim 1 in which the second compression encoding conditions are established to constrain a quality metric of the second compressed output digitized data set equal to or between predetermined upper and lower metric value extremes, the second digital compression encoder adapted to utilize the second compression encoding conditions to output the second compressed output digitized data set with the quality metric of the second compressed output digitized data set equal to or between the predetermined upper and lower metric value extremes.

4. A digital data compression system as set forth in claim 1 in which;

the uncompressed digital data sequence comprises a first plurality of uncompressed data sets;

at least one second compression encoding condition is established from a first compression of one of the first plurality of uncompressed first data sets;

the at least one of the second compression encoding conditions is used to constrain the total number of bits of the corresponding second compressed digitized data sets, to be equal to or less than a predetermined maximum number of bits.

5. In the digital data compression system of claim 1, in which the second compression encoding conditions are established to constrain the maximum number of bits of the second compressed output digitized data set equal to or below a predetermined maximum bit count, the second digital compression encoder adapted to utilize the second compression encoding conditions to output the second compressed output digitized data set with the maximum number of bits of the second compressed output digitized data set equal to or below a predetermined maximum bit count.

6. A digital data compression system as set forth in claim 1 having a motion steadying filter for steadying the image of an uncompressed digital video data set prior to the first encoder.

7. A digital data compression system as set forth claim 1 in which the digital filters have controllable filter characteristics capable of being changed on a basis selected from the group of pixel-by-pixel, block-by-block, frame-by-frame, GOP-by-GOP and combinations thereof.

8. A digital data compression system as set forth in claim 1 in which the digital filter's filter characteristics are changed by inputs received from a companion processor.

9. A digital data compression system as set forth in claim 1 having digital filters for filtering the uncompressed digitized data sets prior to the second encoding of the uncompressed digitized data sets.

10. A digital data compression system as set forth in claim 9, in which the filters are selected from the group consisting of spatial, temporal, median and motion steadying filters.

11. A method for selecting a first one of second output encoding conditions from a plurality of second output encoding conditions for a first uncompressed input digital bit stream of video data comprising the frames of a first group of pictures (a first GOP), to maintain a transmitted bit rate of an compressed output second encoded bit stream corresponding to the GOP, at or below a predetermined value, the method for determining the output encoding conditions comprising the steps of:

receiving the first uncompressed input digital bit stream of video data comprising the frames of the GOP (the input bit stream) into a first-encode chip;

capturing the uncompressed input bit stream in a memory;

first encoding the uncompressed input digital bit stream in the first-encode chip based on a set of first-encode condition inputs;

outputting a set of first-encode chip output parameter values from the first-encode chip, at least one of which is a first encoded output bit stream bit rate, based on the first encoding of the uncompressed input bit stream;

determining, from at least the set of first-encode chip output parameter values, a second set of encoding parameters for encoding the first uncompressed input bit stream with a second encoder chip;

providing the second set of encoding parameters for encoding the input bit stream to the second encoding chip;

providing the uncompressed input bit stream to the second encode chip;

encoding the uncompressed input bit stream using the second set of encoding parameters applied to the second encode chip and generating an output bit stream having a lower bit rate than the encoded output bit stream bit rate from the first-encode chip;

outputting the second encoded digital bit stream from the second encode chip.

12. The method of claim 11 in which the input digital bit stream has been corrected for horizontal and vertical frame movement prior to first encoding the input bit stream and prior to storing the input bit stream in memory.

13. The method of claim 11, further comprising a step of filtering the input bit stream before providing the input bit stream to the second encode chip.

14. The method of claim 11, further comprising:

a plurality of steps of first encoding the input bit stream with a plurality of first-encode chips, each having a respective set of first-encode condition inputs, and each outputting a respective set of first-encode chip output parameter values, at least one of each is a respective first encoded output bit stream bit rate, based on the respective first encoding of the input bit stream;

determining, from at least the plurality of the sets of first-encode chip output parameter values, a second set of encoding parameters for encoding the input bit stream using the second encoder chip into a second encoded output bit stream having a lower bit rate than the first encoded output bit stream bit rate from any of the plurality of first-encode chips.

15. A digital data compression encoding method for successively compressing each of a preceding digital input bit stream and a following digital input bit stream, the method comprising the steps of:

a step of receiving the preceding digital input bit stream;

a step of providing at least one first encoding condition input for compressing the preceding digital input bit stream;

a step of storing the preceding digital input bit stream in a memory;

a step of performing a first compression encoding of the preceding digital input bit stream using the at least one first-encoding-condition input;

a step of calculating at least one statistical measure of the first compression encoding of the preceding digital input bit stream;

a step of computing at least one following-compression-encoding condition input from the at least one statistical measure of the first compression encoding of the preceding digital input bit stream;

a step of retrieving the preceding input bit stream from the memory;

providing the retrieved preceding input bit stream and the at least one following-compression-encoding input to a second compression-encoding device;

a step of performing a second compression encoding of the retrieved preceding input bit stream with the second compression encoding device using the at least one following-compression-encoding input to produce an output compressed bit stream of the preceding input bit stream, during the following steps;

a step of receiving the following digital input bit stream;

a step of providing at least one first encoding condition input for compressing the following digital input bit stream;

a step of storing the following digital input bit stream in a memory;

a step of performing a first compression encoding of the following digital input bit stream;

a step of calculating at least one statistical measure of the first compression encoding of the following digital input bit stream;

a step of computing at least a second following-compression-encoding condition input from the at least one statistical measure of the first compression encoding of the following digital input bit stream.

16. The method of claim 15 in which the output compressed bit stream is combined with a plurality of bit streams.

17. The method of claim 15 in which the output compressed bit stream is combined with a plurality of bit streams in which at least one of the plurality of bit streams is another output compressed bit stream produced by the method of claim 13.

18. The method of claim 15 in which at least one of the plurality of bit streams is an audio bit stream.

19. The method of claim 15 in which at least one of the plurality of bit streams is a bit stream selected from the group of INTERNET packet data, meteorological data, and weather map data.

20. The method of claim 15 in which the memory is a companion memory selected from the group of DRAMs, SRAMs, and VRAMs.

21. The method of claim 15 in which the step of performing a first compression encoding is performed by a first encoder selected from the group of MPEG1, MPEG2 and JPEG encoders.

22. The method of claim 15 in which the step of performing a second compression encoding is performed by a second encoder selected from the group of MPEG1, MPEG2 and JPEG encoders.

23. The method of claim 15 in which the digital input bit streams are digitized video data.

24. A digital data compression system for successively compressing each of a preceding digital input bit stream and a following digital input bit stream, comprising:

means for receiving the preceding digital input bit stream;

means for providing at least one first encoding condition input for compressing the preceding digital input bit stream;

means for storing the preceding digital input bit stream in a memory;

means for performing a first compression encoding of the preceding digital input bit stream using the at least one first-encoding-condition input;

means for calculating at least one statistical measure of the first compression encoding of the preceding digital input bit stream;

means for computing at least one following-compression-encoding condition input from the at least one statistical measure of the first compression encoding of the preceding digital input bit stream;

means for retrieving the previously stored preceding input bit stream from the memory;

means for providing the retrieved preceding input bit stream and the at least one following-compression-encoding input to a second compression-encoding device;

means for performing a second compression encoding of the retrieved preceding input bit stream with the second compression encoding device using the at least one following-compression-encoding input to produce an output compressed bit stream of the preceding input bit stream;

means for receiving the following digital input bit stream;

means for providing at least one first encoding condition input for compressing the following digital input bit stream;

means for storing the following digital input bit stream in a memory;

means for performing a first compression encoding of the following digital input bit stream;

means for calculating at least one statistical measure of the first compression encoding of the following digital input bit stream;

means for computing at least a second following-compression-encoding condition input from the at least one statistical measure of the following compression encoding of the following digital input bit stream.

25. A digital data compression system as set forth claim 24 in which the output compressed bit stream of the preceding input bit stream is controlled to have a different quality level than another associated bit stream.

26. A digital data compression system as set forth claim 24 in which the output compressed bit stream of the preceding input bit stream is controlled to have a different maximum bit rate than another associated bit stream.

* * * * *